(12) United States Patent
Ball et al.

(10) Patent No.: US 8,342,555 B2
(45) Date of Patent: Jan. 1, 2013

(54) COLLAPSIBLE RECUMBENT TRICYCLE

(76) Inventors: Alan Roy Ball, Park Orchards (AU); Eric John Ball, Park Orchards (AU)

( * ) Notice: Subject to any disclaimer, the term of this patent is extended or adjusted under 35 U.S.C. 154(b) by 29 days.

(21) Appl. No.: 12/840,332

(22) Filed: Jul. 21, 2010

(65) Prior Publication Data

US 2011/0248467 A1     Oct. 13, 2011

Related U.S. Application Data

(63) Continuation-in-part of application No. 12/724,438, filed on Apr. 13, 2010, now abandoned.

(51) Int. Cl.
*B62K 15/00* (2006.01)
*B62K 19/00* (2006.01)

(52) U.S. Cl. .................. 280/278; 280/282; 280/287

(58) Field of Classification Search .............. 280/278, 280/282, 287
See application file for complete search history.

(56) References Cited

U.S. PATENT DOCUMENTS

| | | | |
|---|---|---|---|
| 4,202,561 | A | 5/1980 | Yonkers |
| 4,548,421 | A | 10/1985 | Wiener |
| 4,767,130 | A | 8/1988 | Fu-Chao |
| 4,878,684 | A | 11/1989 | Lemle |
| 4,911,458 | A | 3/1990 | Lin et al. |
| 5,069,469 | A | 12/1991 | Rosengrant et al. |
| 5,145,196 | A | 9/1992 | Langkamp |
| 5,284,355 | A | 2/1994 | Ishii |
| 5,440,948 | A | 8/1995 | Cheng |
| 5,584,494 | A | 12/1996 | Krumm |
| 5,762,351 | A | * 6/1998 | SooHoo .................. 280/267 |
| 6,367,824 | B1 | * 4/2002 | Hayashi ................. 280/62 |
| 6,575,486 | B2 | 6/2003 | Ma |

(Continued)

FOREIGN PATENT DOCUMENTS

DE       29911684 U1    1/2000

(Continued)

OTHER PUBLICATIONS

WizWheelz, MI, USA, Terratrike Owners Manual, Feb. 2008, particularly p. 14, item "Adjusting the seat angle recline" and the adjacent image. http://www.terratrike.com/media/documents/TerraTrikeOwnersManual2008.pdf.

(Continued)

*Primary Examiner* — Tashiana Adams
*Assistant Examiner* — Marc A Scharich
(74) *Attorney, Agent, or Firm* — DeLio & Peterson, LLC; Peter W. Peterson

(57) ABSTRACT

One embodiment of a tricycle (20) having a spine frame (22), supported by a rear wheel (34) and a pair of steerable front wheels (36), and supporting a recumbent seat (42) pivotably attached at its rear. A pedal boom (44) extends forwardly of the spine (26) and supports a pedal crank assembly (46). The front wheels each support a lateral arm (28) with the front wheel pivotably attached at the distal end and an angular projection (80) attached at the proximal end. A pivot (78) connects each angular projection to the spine, allowing the lateral arms and attached front wheels to fold to a stowed position alongside the spine. Another pivot (84) connects the boom to the spine, allowing the boom fold back to a stowed position against the spine. In the travel position, a clamp arrests the angular projections, and can arrest the boom and seat. The tricycle is collapsible to several levels of compactness. Other embodiments are described and shown.

25 Claims, 18 Drawing Sheets

U.S. PATENT DOCUMENTS

| | | | |
|---|---|---|---|
| 6,742,797 B2 | | 6/2004 | Lopez |
| 6,953,203 B2 | * | 10/2005 | Wilcox et al. ................. 280/282 |
| 6,988,741 B2 | * | 1/2006 | Borochov et al. ............ 280/282 |
| 7,059,621 B2 | | 6/2006 | Di Blasi et al. |
| 7,207,407 B2 | | 4/2007 | Huber |
| 7,354,055 B2 | | 4/2008 | Rasmussen |

FOREIGN PATENT DOCUMENTS

| | | |
|---|---|---|
| DE | 102010006378 A1 | 8/2011 |
| EP | 1291275 A2 | 3/2003 |
| EP | 2075183 A1 | 1/2009 |
| KR | 20100009051 | 9/2010 |

OTHER PUBLICATIONS

Velo Vision, United Kingdom, Velo Vision Mar. 2007, pp. 12-15, "Three Wheel Challenge", particularly on p. 14 the image "below right" showing the "steering tracking adjustment" on the Challenge Concept tricycle. http://www.challengebikes.com/documents/vv25-challenge-trike.pdf.

Greenspeed, Australia, GTO Packing Instructions (Disc Brake Version), Aug. 6, 2004, particularly item 7. http://www.greenspeed.com.au/GTOPacking.htm.

Greenspeed, Australia, GT-series Folding Trike Owner Manual, [undated], particularly on p. 2 the image "Tricycle Anatomy" and on p. 8 the item "Regular Folding". http://www.greenspeed.com.au/pdfs/GTmanual.pdf.

Figure 3:
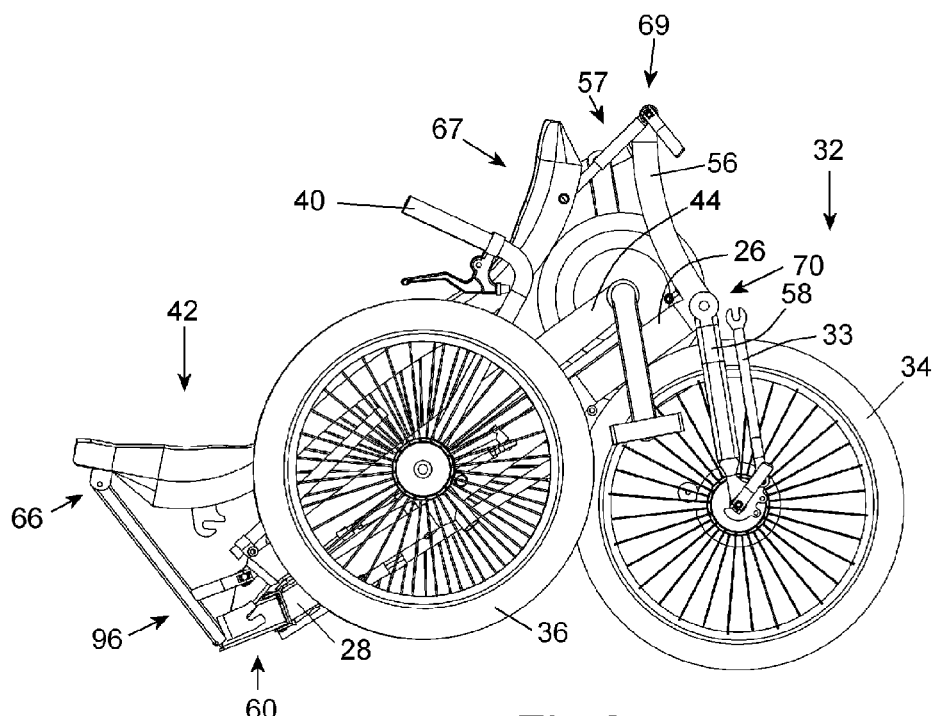

JM Recumbents, Mexico, Users Manual—JM X2, [undated], particularly Fig.3 on p. 3. http://www.jmrecumbents.com/manual/SHORTMANUAL.pdf.

JM Recumbents, Mexico, Folding Recumbent Trikes, catalogo.pdf, [undated], particularly on p. 5 the image of the collapsed frame showing holes on the stub members and on the lateral arms for fasteners to arrest rotation of the lateral arms. http://www.jmrecumbents.com/catalogo/catalogo.pdf.

Aiolos, Germany, Aiolos Trilite pricelist TL.DH 0.9 24, Feb. 2009, particularly on p. 3 the image of one embodiment showing the frame area adjacent to the radius arm including stays between the spine and the lateral arms. http://www.aiolos.de/fileadmin/www.aiolos.de/pdf/Trilite_TL.DH_0.9.pdf.

Velo Vision, UK, Velovision Special Needs Buyers Guide, Velo vision Issue 11, Sep. 2003, particularly on the final page, the item "Travel by Trilite" with images of an Aiolos Trilte. http://www.velovision.com/mag/issue11/specialneeds150.pdf.

Inspired Cycle Engineering Ltd, UK, ICE 2010 Owner's Manual, Feb. 11, 2010, particularly section 2.2 Folding and Unfolding, pp. 4-6. www.icetrikes.co.uk/Downloads/2010_Owners_Manual.pdf.

* cited by examiner

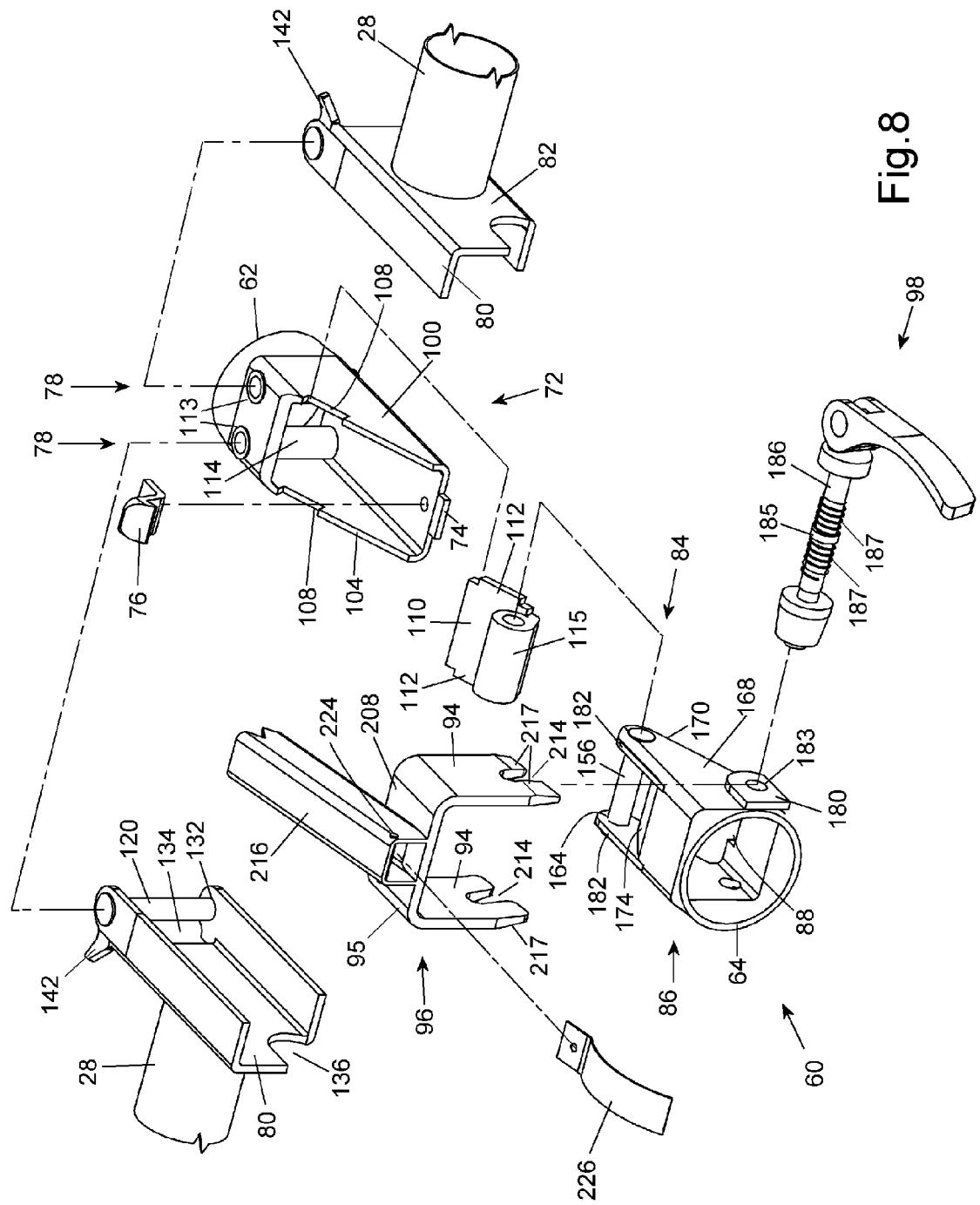

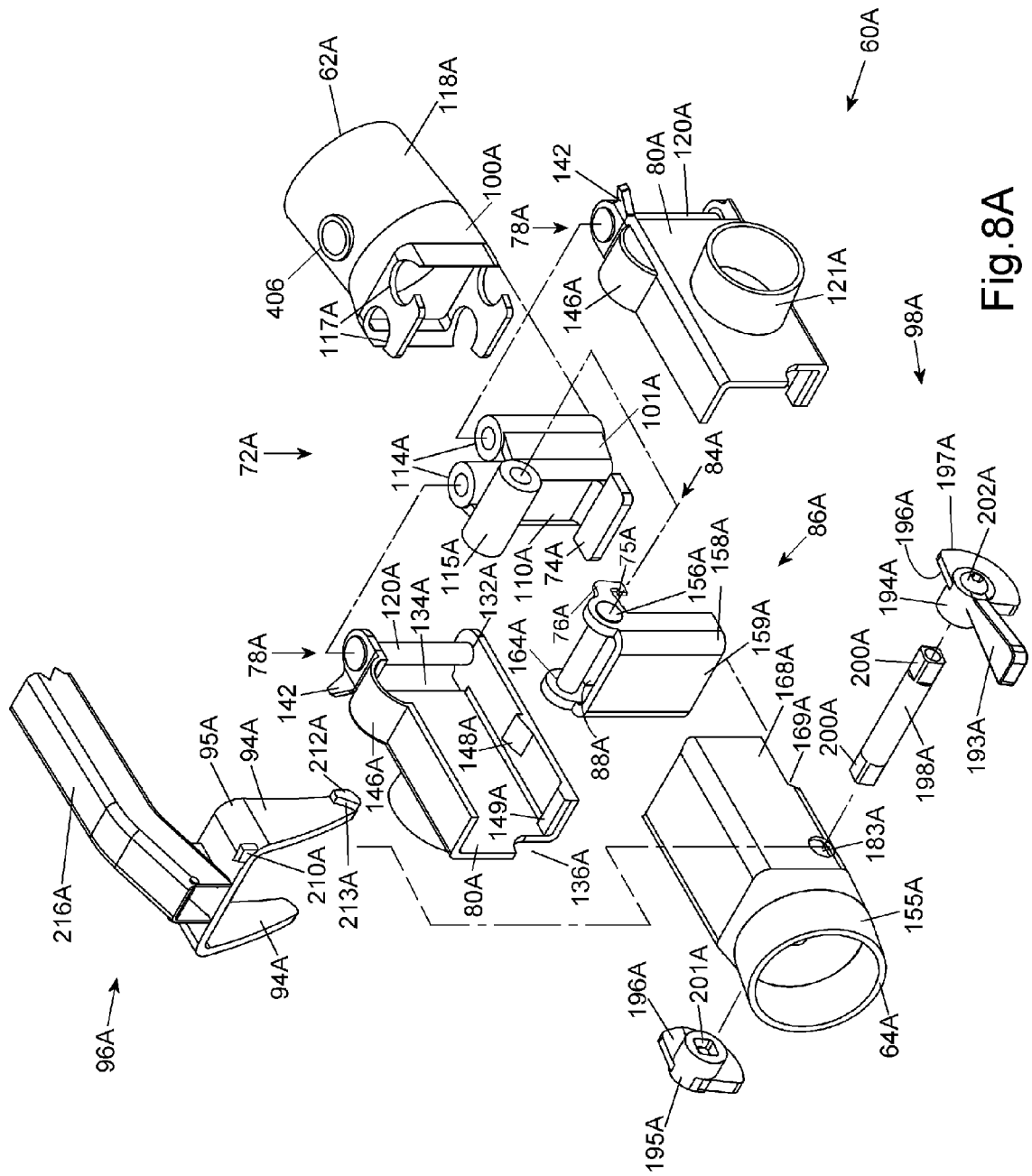

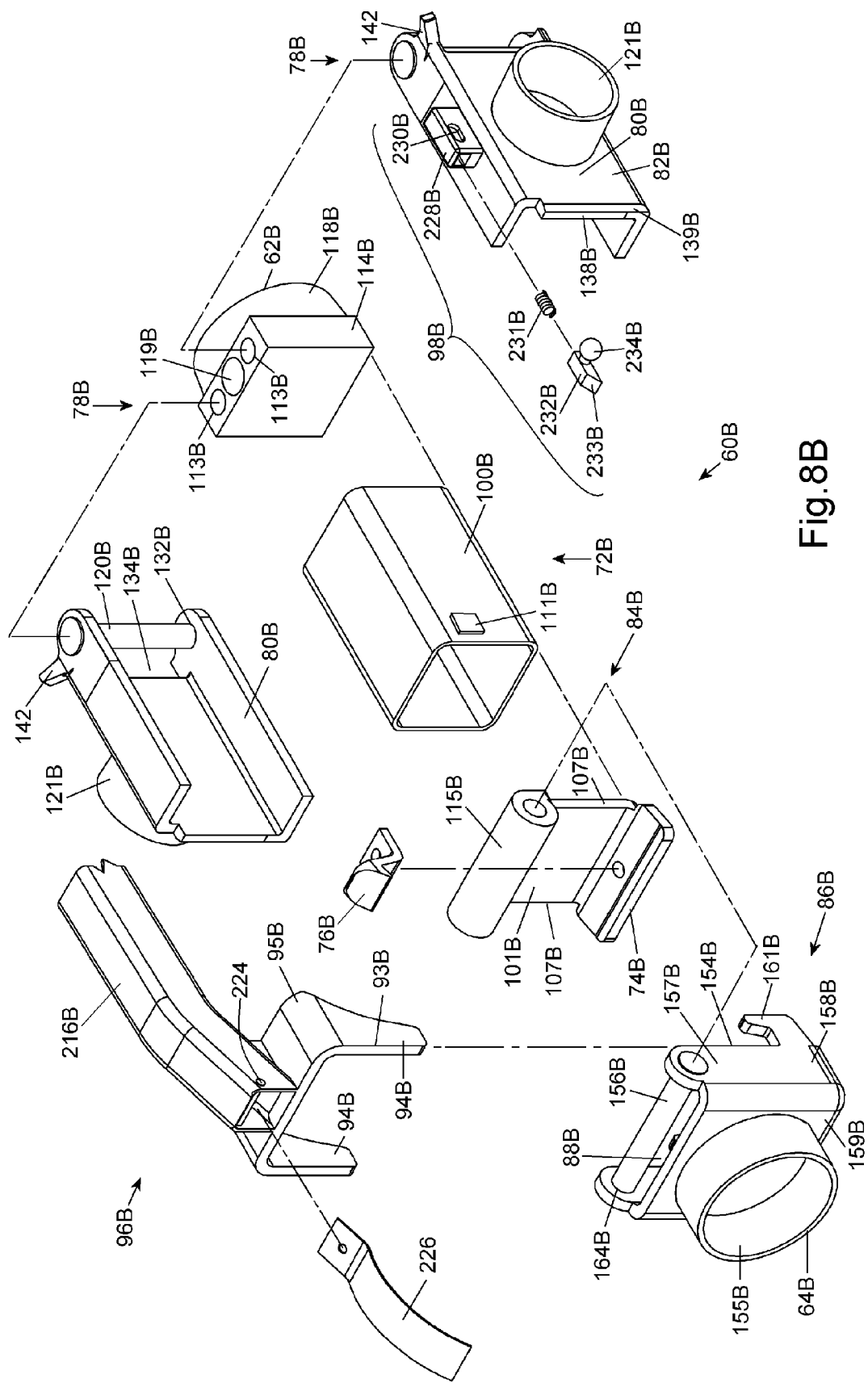

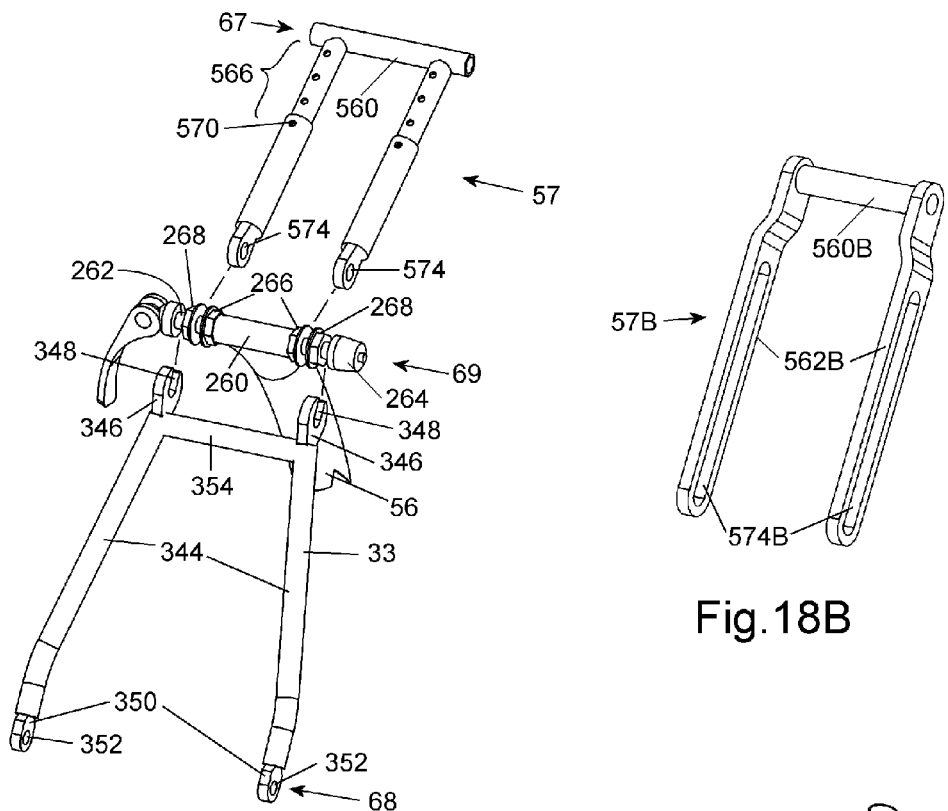
Fig. 18
Fig. 18B
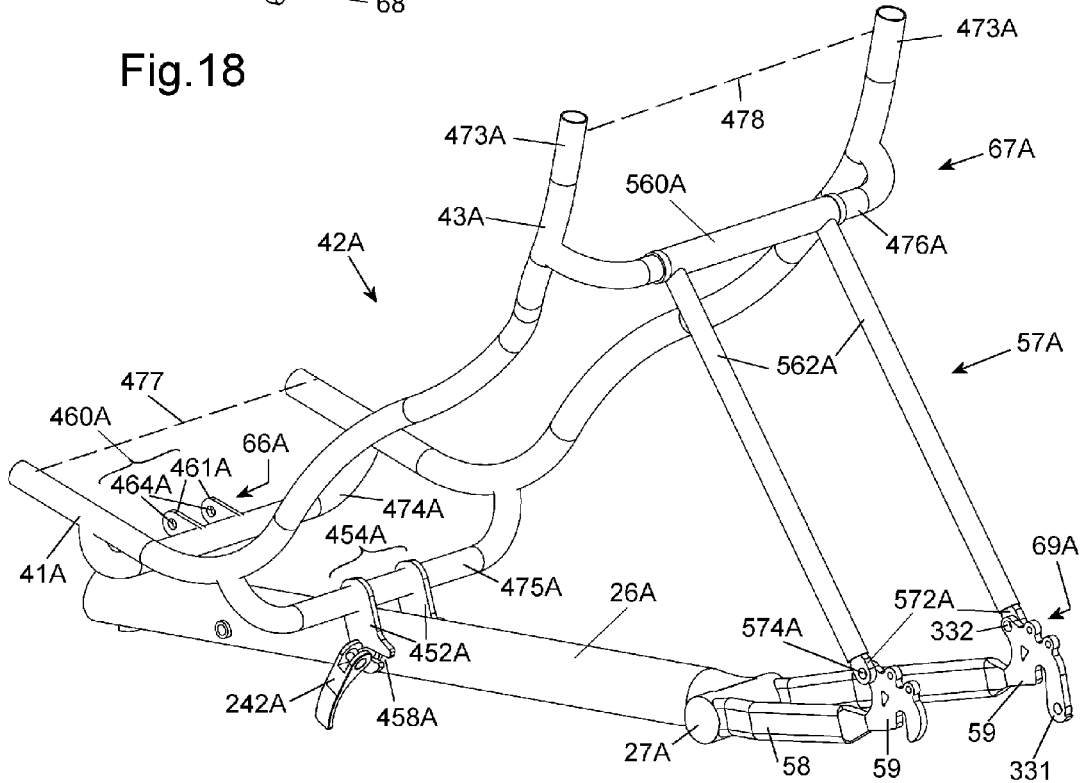
Fig. 18A

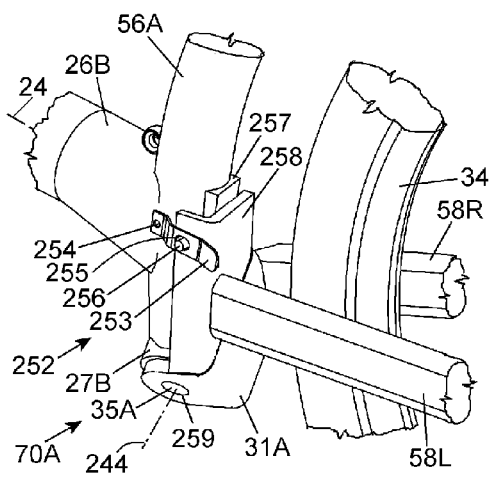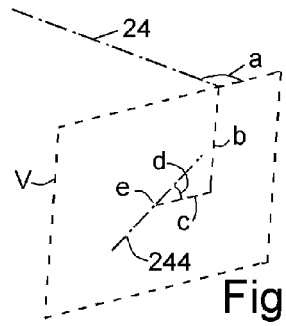
Fig.19A
Fig.19
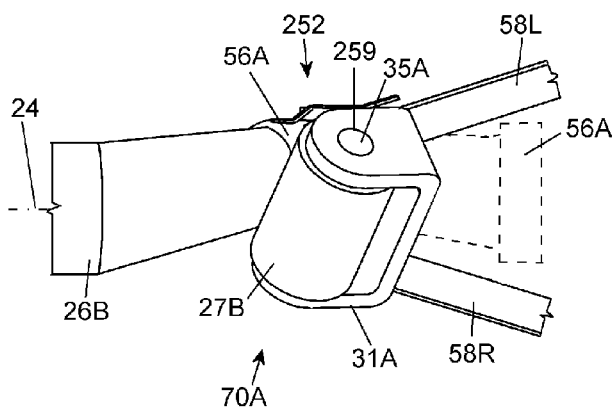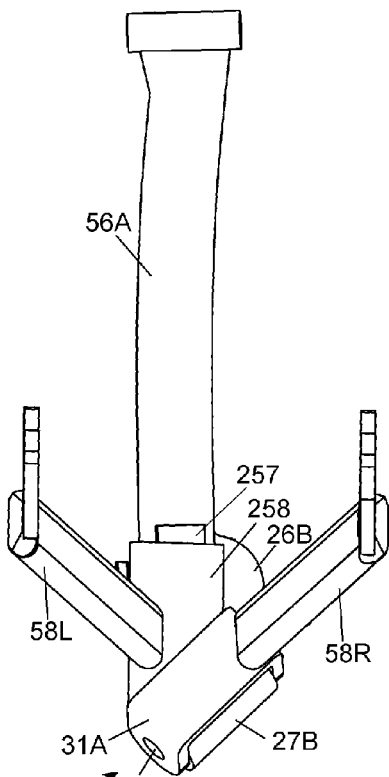
Fig.19C
Fig.19B
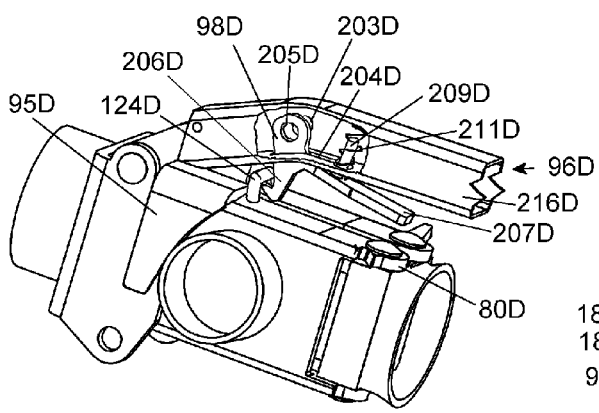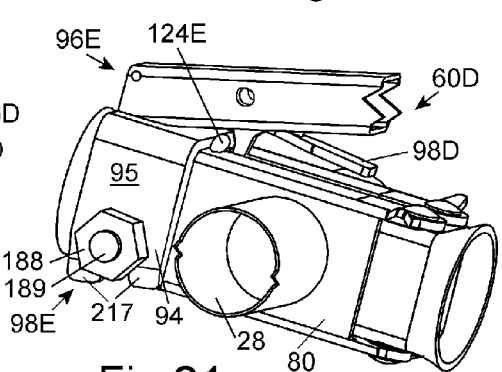
Fig.20
Fig.21

COLLAPSIBLE RECUMBENT TRICYCLE

CROSS-REFERENCE TO RELATED APPLICATIONS

This application is Continuation in Part of application Ser. No. 12/724,438, Filed 2010 Apr. 13, which is now abandoned.

FEDERALLY SPONSORED RESEARCH

Not Applicable.

SEQUENCE LISTING OR PROGRAM

Not Applicable

BACKGROUND OF THE INVENTION

1. Field of the Invention

This invention is generally related to small land vehicles and, more particularly to recumbent tricycles.

2. Description of Related Art

Recumbent tricycles or trikes are closely related to recumbent bicycles, but have three wheels instead of two. The added wheel eliminates the need for the rider to balance to keep the vehicle upright, almost eliminating the possibility of falling from the vehicle, a major cause of injury with two-wheeled bicycles. A recumbent tricycle is a tricycle that places the rider in a laid-back reclining position and which has a pedal crank in the front area of the tricycle. The reclined, legs-forward position of the rider's body presents a smaller frontal area and delivers an aerodynamic advantage over conventional tricycles. Additionally the rider's weight is distributed over the rider's back and buttocks on a seat that can be shaped for comfort. Recumbent bicycles and means for collapsing vehicle frames have been described in the literature as well as various patents. An example of a recumbent bicycle having adjustable-length frame and adjustable-angle seat is shown in U.S. Pat. No. 5,584,494. An example of a recumbent bicycle having under-seat steering connected by a steering link is shown in U.S. Pat. No. 4,283,070.

Recumbent tricycles are manufactured using the range of manufacturing methods used for bicycles, including frame fabricating materials and methods and the use of the range of standard bicycle components including frame parts, wheels, brakes, gears, pedal cranks and suspension parts. In addition there are further methods and components that are often used on both recumbent tricycles and recumbent bicycles, including seats adjustable in position and angle, chain pulleys and chain sleeves to contain side and vertical movement of the long chain, and an adjustment between the seat and pedals for riders of differing leg length. Examples of recumbent tricycles are shown in U.S. Pat. Nos. 7,354,055; 5,069,469 and 4,548,421.

One type of recumbent tricycle has a seat in front of a rear wheel, a pair of forward steering or front wheels and a pedal crank assembly at the front, and is known as a "tadpole" tricycle. A common type of tadpole tricycle has a spine frame, supported by a rear wheel and a pair of steerable front wheels. A pedal boom extends forwardly of the spine and supports the pedal crank assembly. A drive system connects the crank assembly with the rear wheel. The spine supports the seat. Each front wheel is each supported from the spine by a lateral arm having a proximal end and a distal end with the front wheel pivotably attached at the distal end. The frame includes one or more rear support members or "chainstays" supporting the rear wheel. A linkage means maintains the front wheels generally parallel irrespective of orientation and can include a pivoted radius arm having a pivot end and an arc end wherein the arc end connects a pair of tie-rods. The tie-rods are usually of round cross-section with each end having threaded connections providing a means to adjust their length and adjust the front wheels parallel. Methods of recumbent seat angle adjustment include the use of adjustable length stays between pivots at the rear of the seat and pivots on the rear frame portion. An example of this type is the tricycle known as the Terratrike Path, shown in Non-Patent Document 1 (WizWheelz, Mich., USA, Terratrike Owners Manual, February 2008, particularly page 14, item "Adjusting the seat angle recline" and the adjacent image).

A vehicle known as the Challenge Concept Trike has tie-tods of aerofoil shape, which can lose their aerodynamic advantage if not aligned with tricycle travel. This vehicle has lateral arms attached rigidly to the spine and is shown in Non-Patent Document 2 (Velo Vision, United Kingdom, Velo Vision March 2007, pp 12-15, "Three Wheel Challenge", particularly on page 14 the image "below right" showing the "steering tracking adjustment" on the Challenge Concept tricycle). The radius arm has two arm parts supported from the forward side of the pivot and continuing around the pivot to the arc end at the rear. Each arm part supports a tie-rod connection at the arc end and fasteners between the arm parts allow for fine adjustment in the width of the tie-rod connection points. This adjustment can allow fine adjustment to align the front wheels parallel while the tie-tods remain aligned with tricycle travel.

Tadpole tricycles designed for racing but not intended to be collapsible have a frame geometry that includes lateral arms that are generally normal to the spine in plan, to provide the most strength and rigidity for the least weight. These high performance tricycles have a low seat for efficient aerodynamics and a low centre of gravity to allow high speed cornering. For maximum efficiency, the drive system has a minimum of diversions and of chain pulleys.

Recumbent tricycles are necessarily long and wide to accommodate a reclining rider and they occupy a large amount of space for storage and for transporting in a motor vehicle, bus, train, an aeroplane or the like. They are difficult to fit through gates and other narrow places. This is a long recognized problem and there have been many attempts to design a tadpole tricycle that collapses easily and quickly to a compact form without compromising the performance properties of the tricycle when in use.

One type of collapsible recumbent tricycle is the type having one or more separation points in the frame with fasteners or coupling devices to hold the frame together. An example of this type is the tricycle known as the Greenspeed GTO, shown in Non-Patent Document 3 (Greenspeed, Australia, GTO Packing Instructions (Disc Brake Version), 6 Aug. 2004, particularly item 7). This type can be collapsed by removing parts including the seat from the frame and separating the frame portions. Also, this type can be collapsed to a small size but collapsing or re-assembling this type requires mechanical skill and usually tools, and takes a considerable time. The collapsed form has separated parts, including the seat, that need to be handled separately to transport.

It can be easier to collapse bicycles and tricycles where a hinge is used in the frame instead of a frame separation point. This method is common in folding bicycles and examples of a locking hinge for a folding bicycle are shown in U.S. Pat. Nos. 5,440,948 and 4,911,458.

Another type of collapsible recumbent tricycle is the type which collapses by removing the seat and then, via a hinge in the spine, folding the rear portion of the tricycle over the front portion of the frame. An example of this type is the tricycle known as the Greenspeed GT3, shown in Non-Patent Document 4 (Greenspeed, Australia, GT-series Folding Trike Owner Manual, (undated), particularly on page 2 the image "Tricycle Anatomy" and on page 8 the item "Regular Folding"). Another example of this type of tricycle is the tricycle known as the ICE Vortex, shown in Non-Patent Document 9 (Inspired Cycle Engineering Ltd, UK, ICE 2010 Owner's Manual, 11 Feb. 2010, particularly section 2.2 Folding and Unfolding, pages 4-6).

In the Vortex, the hinge pivot is oriented to place the rear wheel generally horizontal when the rear portion of the tricycle folds over the front portion of the frame. This folding means allows the use of a larger rear wheel while potentially decreasing the tricycle folded height. In all tricycles of this type the hinge opens at the bottom and so the weight of the rider applies a force to open the hinge if the hinge locking devices should ever release while being ridden, a significant problem. The embodiment shown in Non-Patent Document 9 includes an example of under-seat steering wherein the handlebars have provision to be unclamped to be adjusted and the upright handlebar ends folded down to be generally horizontal to allow space for the rear wheel. Collapsing this type produces a still bulky assembly that requires some mechanical skill and considerable time to reassemble the removed parts.

The collapsed tricycle has reduced length but approximately the same width. In some embodiments the main collapsed assembly can be awkwardly rolled on the two front wheels but the width of the tricycle severely limits the usefulness of this function. The collapsed tricycle still requires considerable storage space and the collapsed form has separated parts, including the seat, that need to be handled separately to transport.

As can be appreciated, inwardly retracting the paired wheels of any type of tricycle can significantly reduce the width of a tricycle. Achieving this in an effective and reliable way has been an ongoing pursuit. Examples of various vehicles having pairs of wheels that can retract inwardly are shown in U.S. Pat. Nos. 7,207,407; 7,059,621; 6,742,797; 6,575,486; 5,284,355 and 4,767,130.

Yet another type of collapsible recumbent tricycle is described in U.S. Pat. No. 5,145,196 (Langkamp). This type has stub members having a proximal end and a distal end extending from each side of the spine with pivots at the distal ends supporting the lateral arms. The pivots allow the lateral arms to fold from a travel position, with distal ends spaced from the spine, to stowed positions alongside the spine and the attached wheels to a stowed position. This type can be collapsed by removing the seat, and moving the lateral arms and thereby the attached front wheels to stowed positions. Collapsing this type of tricycle reduces the width but does not reduce the length of the tricycle.

The combined stub members and lateral arms occupy a significant vertical area. This vertical area precludes a low seat height and a low centre of gravity. The drive system diverts under this area and uses multiple chain pulleys. The lateral arms are arrested in the travel position by separate fasteners through clearance holes. Any movement at these fasteners or at the lateral arm pivots is amplified at the distal ends of the lateral arms by approximately the ratio of the lateral arm length to the distance between the pivot and the fastener. This can lead to tricycle steering problems and instability especially when travelling at high speed. This type also includes separate fasteners securing the seat, resulting in a plurality of fasteners on the tricycle and this type can take a considerable time to collapse and re-assemble. The separate pivot assemblies for each folding action also provide no mutual re-enforcement or part sharing for weight reduction. The collapsed tricycle still requires considerable storage space and the collapsed form has separated parts, including the seat, that need to be handled separately to transport.

Yet another type of collapsible recumbent tricycle is known as the JM Recumbents JMX2. This vehicle is shown in Non-Patent Document 5 (JM Recumbents, Mexico, Users Manual—JM X2, [undated], particularly Fig. 3 on page 3) and Non-Patent Document 6 (JM Recumbents, Mexico, Folding Recumbent Trikes, catalogo.pdf, [undated], particularly on page 5 the image of the collapsed frame showing holes on the stub members and on the lateral arms for fasteners to arrest rotation of the lateral arms). This type additionally includes a pivot for folding the boom back and against the spine, means for removing the rear wheel, and a pivot for folding the rear chainstays forward and adjacent the spine when the rear wheel has been removed. The pivot axis is generally horizontal and normal to the spine axis to maintain the rear wheel (if it could remain attached) generally vertical. The lateral arms are oriented forward at a significant angle to the spine normal, resulting in longer lateral arms and deviating from the optimum frame geometry for high performance recumbent tricycles.

Similar to the Langkamp type this type has lateral arm pivots on stub members, and the lateral arms are arrested in the travel position by separate fasteners through clearance holes, and the drive system diverts under the stub members and uses multiple chain pulleys. Any movement at the lateral arm pivots or fasteners, resulting from causes such as clearances or wear, is amplified at the distal ends of the lateral arms and can lead to tricycle steering problems and instability. The longer lateral arms increase any movement at the lateral arm pivots. The tricycle includes separate fasteners for securing the seat and also for arresting boom pivot rotation, the plurality of fasteners making this type slow to collapse and re-assemble the front of the tricycle. The seat must be removed to permit the boom to fold back against the spine. Additionally the separate pivot assemblies for each folding action provide no mutual re-enforcement or part sharing for weight reduction. This type can be reduced to a compact size but collapsing this type takes a considerable time and the collapsed form has separated parts, including the seat, that need to be handled separately to transport.

Yet another type of collapsible recumbent tricycle includes tricycles known as Aiolos Trilite. Embodiments of this type are shown in Non-Patent Document 7 (Aiolos, Germany, Aiolos Trilite pricelist TL.DH 0.9 24", February 2009, particularly on page 3 the image of one embodiment showing the frame area adjacent to the radius arm including stays between the spine and the lateral arms) and Non-Patent Document 8 (Velo Vision, UK, Velovision Special Needs Buyers Guide, Velo vision Issue 11, September 2003, particularly on the final page, the item "Travel by Trilite" with images of an Aiolos Trilte). This type also includes a pivot for folding the boom back and against the spine, means for removing the rear wheel, and a pivot for folding the rear chainstays forward and adjacent the spine when the rear wheel has been removed. The pivot axis is generally horizontal and normal to the spine axis to maintain the rear wheel (if it could remain attached) generally vertical. It includes lateral arm pivots on stub members but the lateral arm pivots are longer than those in the JM type and provide increased support to the lateral arms compared to that prior type. However the stub members and lateral arm pivots occupy a significant vertical area. This vertical area precludes a low seat height and low centre of gravity. The drive system diverts under this area and uses multiple chain pulleys. This type also includes extra stays between an intermediate portion of the lateral arms and the spine to arrest the lateral arms in the travel position.

In one embodiment of this type (refer Non-Patent Document 7) a fastener on each stay connects that stay to the spine and those fasteners need to be individually removed to stow the lateral arm. In another embodiment of this type (refer Non-Patent Document 8) a fastener connects the stays to the spine and is slideable along the spine to stow the lateral arms. This embodiment includes a radius arm that is also slideable along the spine, allowing the tie-rod length to be accommodated when the lateral arms are stowed. Additionally the tricycle includes separate fasteners for securing the seat and also for arresting the boom pivot, the plurality of fasteners making this type slow to collapse and re-assemble the tricycle. The seat must be removed to permit the boom to fold back against the spine. The separate pivot assemblies for each folding action provide no mutual re-enforcement or part sharing for weight reduction. This type can be reduced to a compact size but collapsing this type takes a considerable time and the collapsed form has separated parts, including the seat, that need to be handled separately to transport. The embodiment of Non-Patent Document 8 includes an example of push-pull (or tractor) steering.

While all the aforementioned recumbent tricycles are variously successful in collapsing a recumbent tricycle to a reduced size they are all deficient with respect to providing a tricycle capable of being quickly collapsed to a compact size and remain whole. Those that can collapse to a compact size all require removal of the seat and the operation or removal of multiple fasteners when collapsing. They thereby require a considerable time to collapse and the collapsing process produces separated parts. Those that can collapse to a compact size by stowing the lateral arms and the boom alongside the spine also make significant compromises to the frame geometry of a performance tricycle. What is needed is a recumbent tricycle that overcomes these problems to provide a tricycle with performance frame geometry and an efficient drive system, and can be collapsed quickly and easily to a compact size, and not require removal of parts from the tricycle.

SUMMARY

A tricycle having a spine frame, supported by a rear wheel and a pair of steerable front wheels; and a spine along a central axis. A pedal boom extends forwardly of the spine and supports a pedal crank assembly. A drive system connects the crank assembly with the rear wheel, and a seat is supported by the spine. The front wheels each support a lateral arm having a proximal end and a distal end with the front wheel pivotably attached at the distal end and an angular projection attached at the proximal end. A pivot connects each angular projection to the spine and allows the lateral arms to fold from a travel position, with distal ends spaced from the spine, to stowed positions alongside the spine. Clamping means on the spine arrests the angular projections in the travel position and releases the angular projections to allow folding of the lateral arms to their stowed position.

The tricycle provides a folding mechanism that is very compact in the travel position to allow the inclusion of performance frame geometry and an efficient drive system, and the tricycle can be collapsed quickly and easily to a compact size. The tricycle includes means to be collapsed quickly to several levels of compactness.

DRAWINGS

List of Figures

Figure 1:
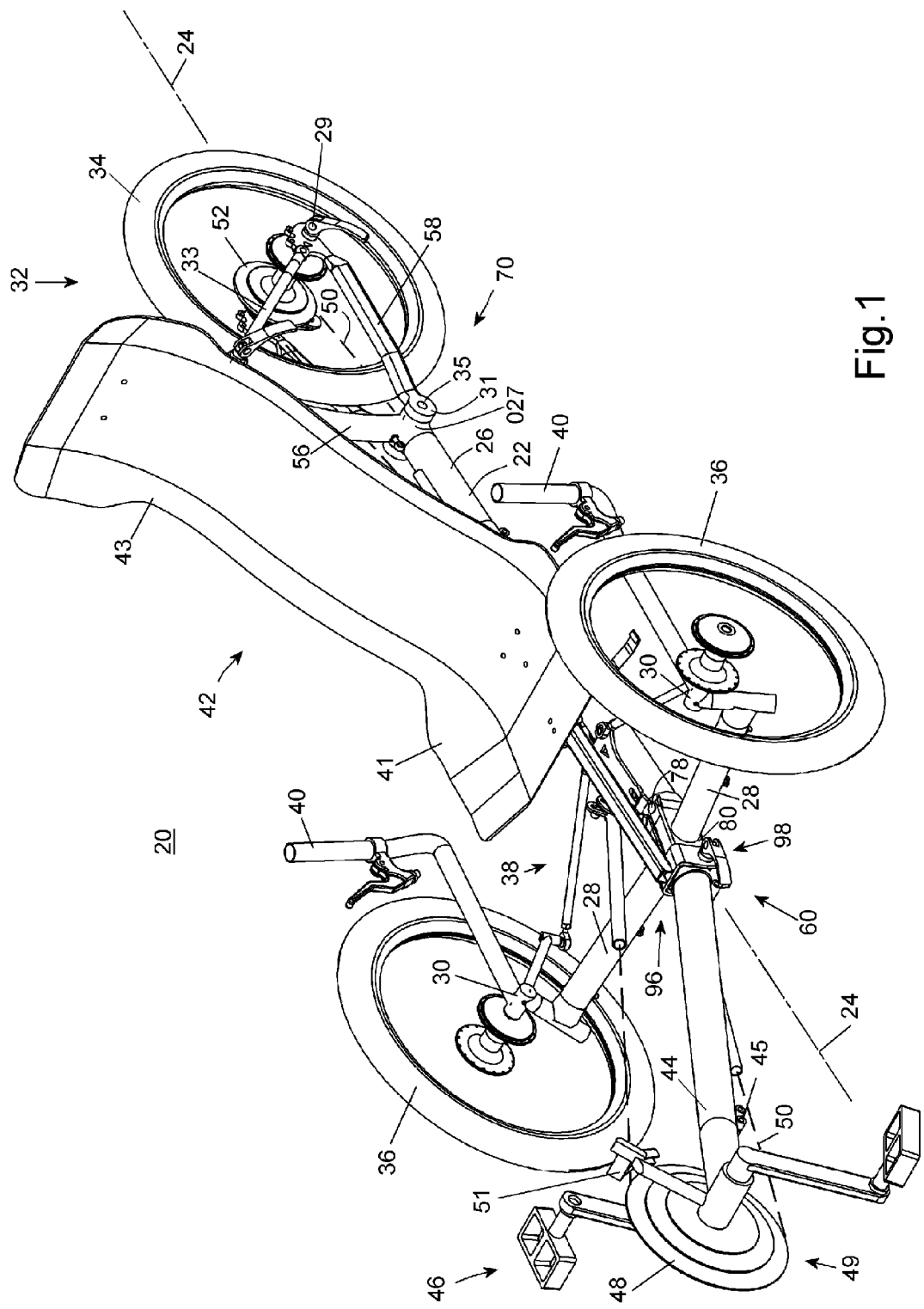

To further clarify the above and other advantages and features of the present invention, a more particular description of the invention will be rendered by references to specific embodiments thereof, which are illustrated in the appended drawings. It is to be appreciated that these drawings depict only typical embodiments of the invention and are therefore not to be considered limiting of its scope. The invention will be described and explained with additional specificity and detail through the use of the accompanying drawings:

FIG. 1 Perspective view of the tricycle in the travel configuration. Wheel spokes and pull-cord are not shown for clarity.

Figure 2:
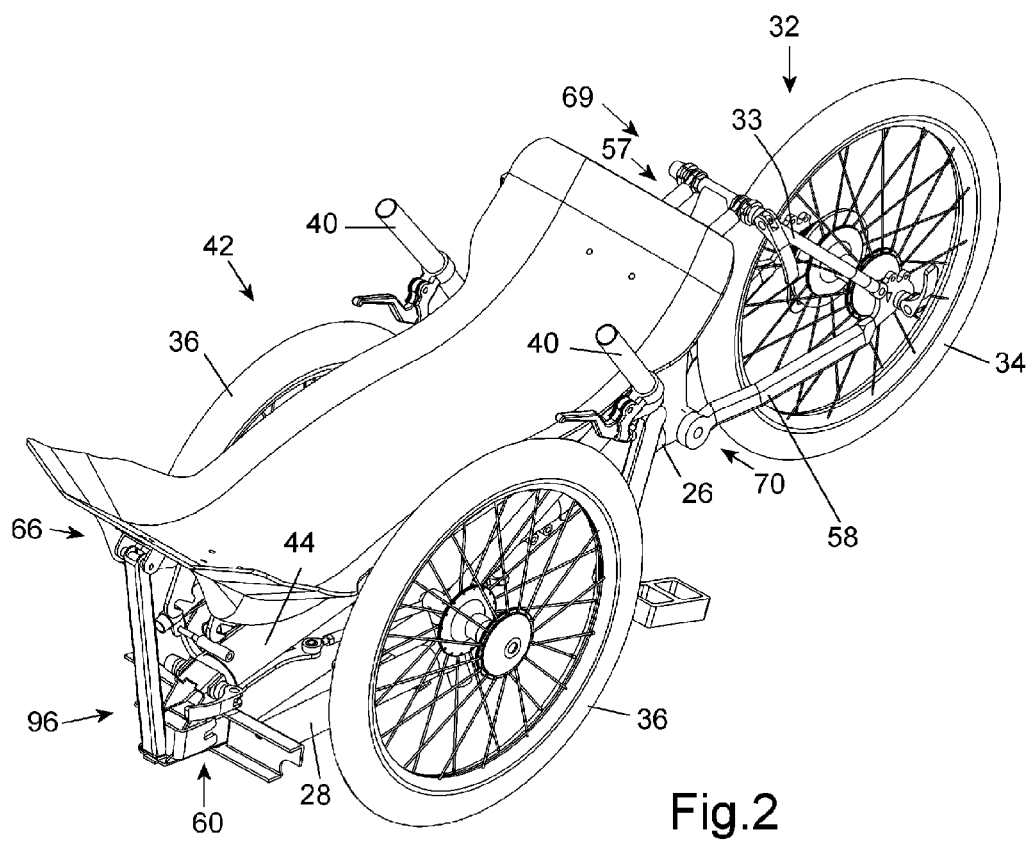

FIG. 2 Perspective view of the tricycle in the compact fold configuration. The chain and pull-cord are not shown for clarity.

FIG. 3 Side elevation of the tricycle in the short fold configuration. The chain and pull-cord are not shown for clarity.

Figure 3A:
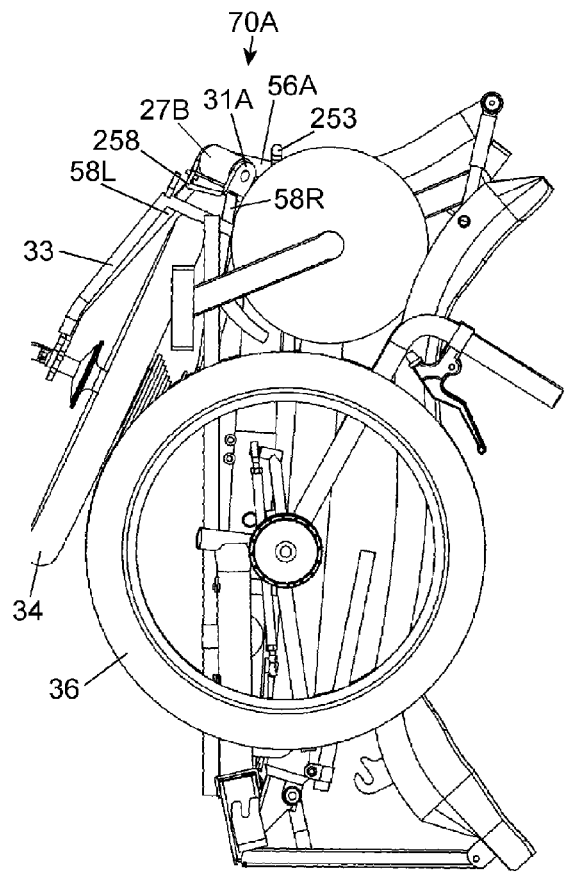

FIG. 3A Side view of the tricycle including the angled chainstay pivot embodiment in the short fold configuration, the tricycle free-standing on its front end. Wheel spokes, the chain and pull-cord are not shown for clarity.

Figure 4A:
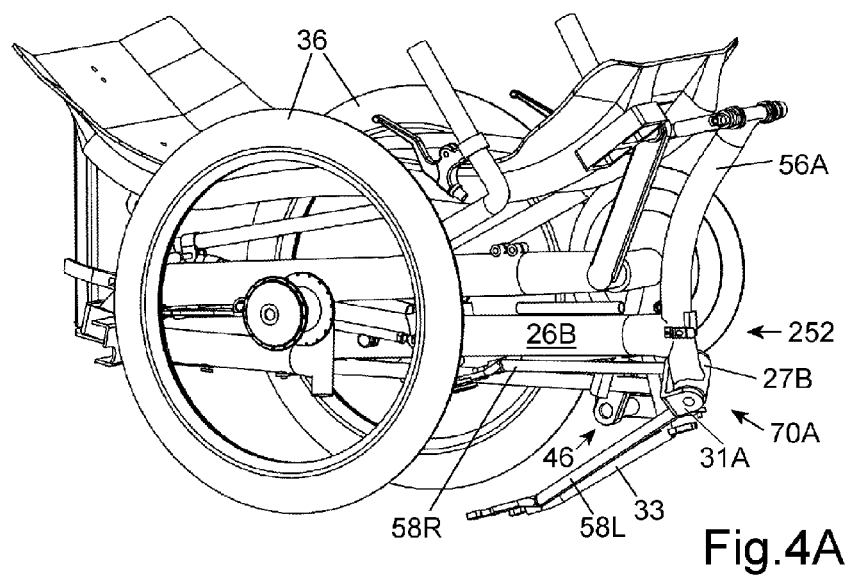
Figure 4:
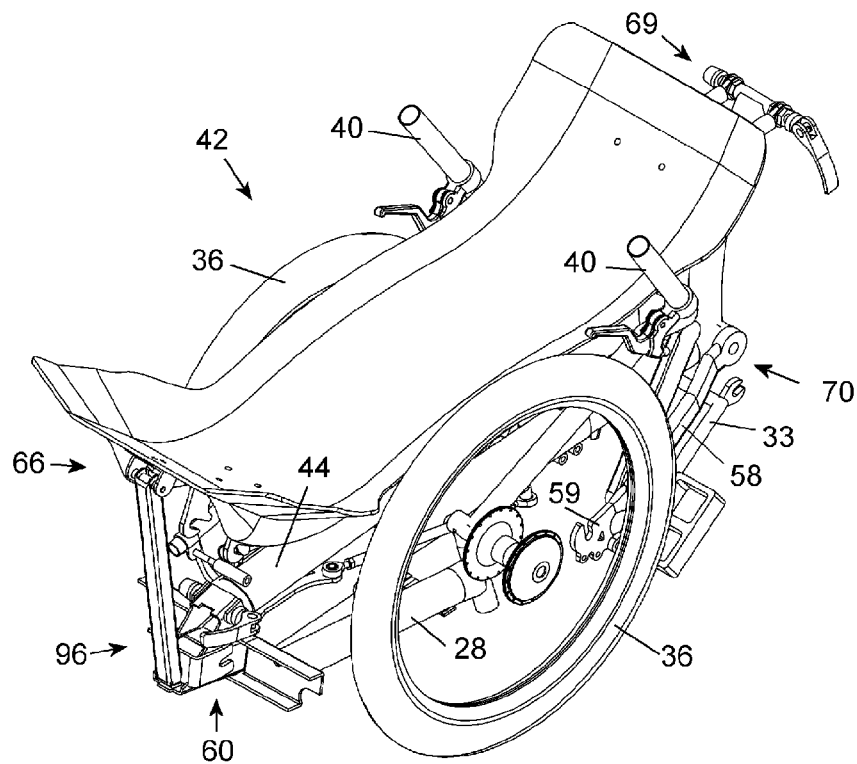

FIG. 4 Perspective view of the tricycle in the subcompact fold configuration without the rear wheel. Wheel spokes, the chain and pull-cord are not shown for clarity.

FIG. 4A Perspective view of the tricycle including the angled chainstay pivot embodiment in the subcompact fold configuration without the rear wheel. Wheel spokes, the chain and pull-cord are not shown for clarity.

Figure 5:
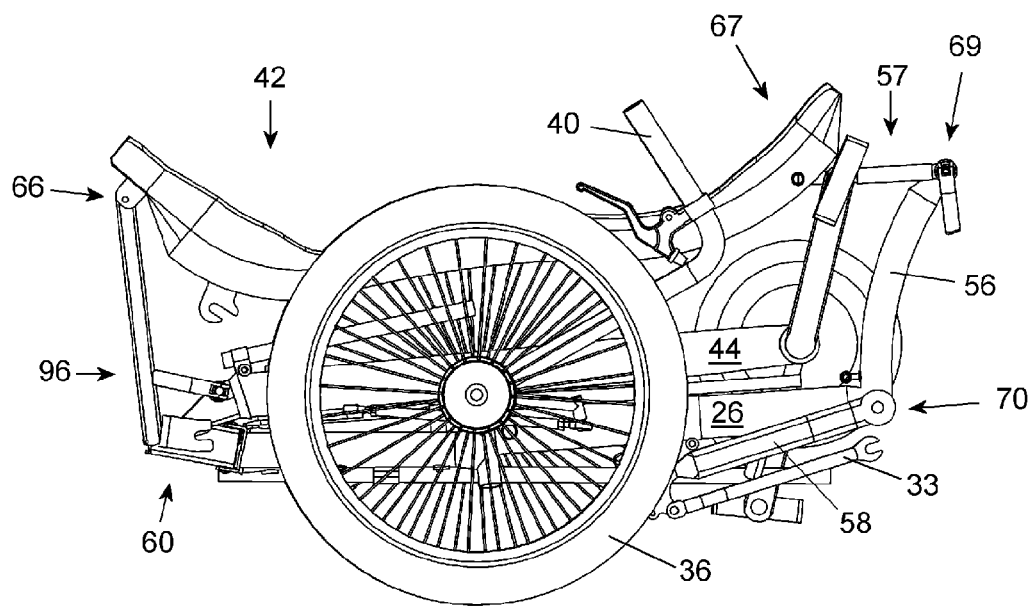

FIG. 5 Side elevation of the tricycle in the suitcase fold configuration without the rear wheel. The chain and pull-cord are not shown for clarity.

Figure 6:
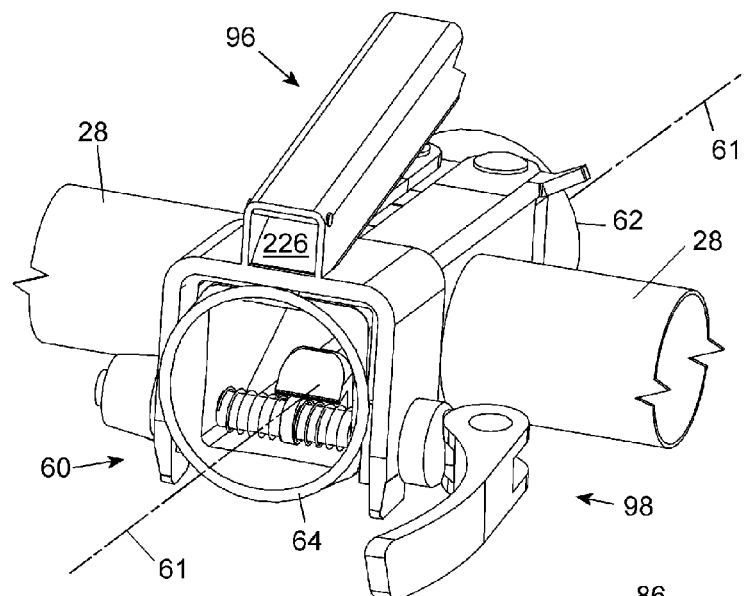

FIG. 6 Perspective view of the compound hinge in the travel configuration, first embodiment. Note that in this figure and the following figures of the compound hinge the rear portion of the tie is not shown and, where the lateral arms are shown, for clarity only the inner portions are shown.

Figure 6A:
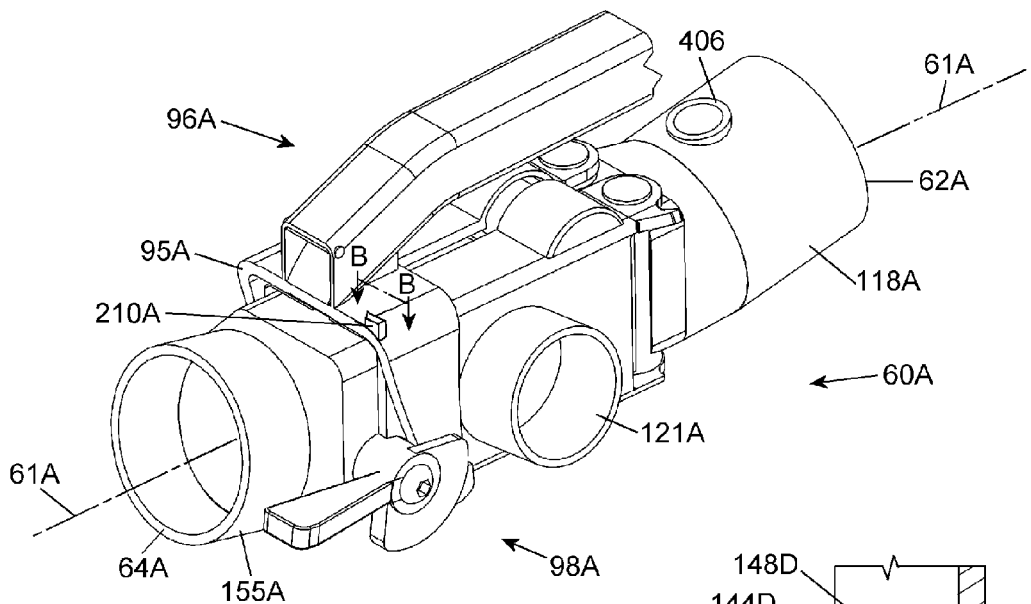

FIG. 6A Perspective view of the compound hinge in the travel configuration, another embodiment.

Figure 6B:
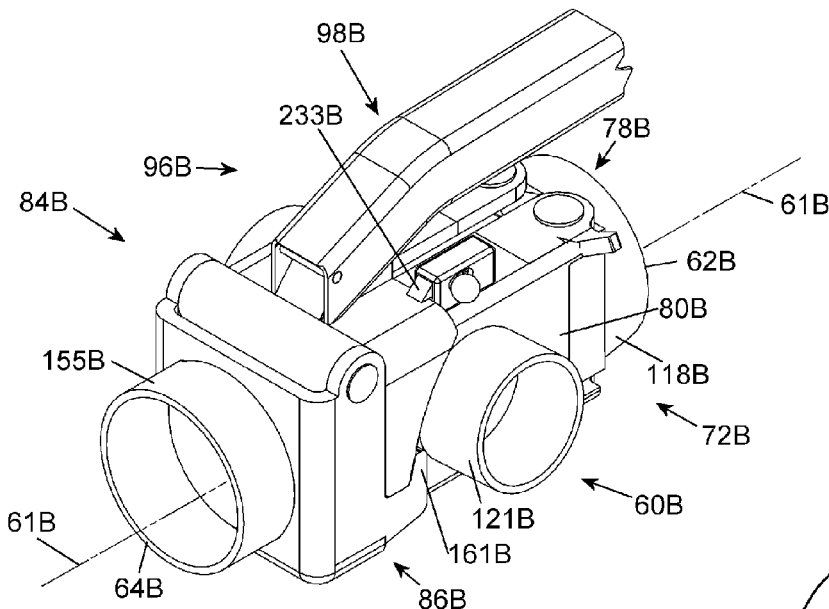

FIG. 6B Perspective view of the compound hinge in the travel configuration, yet another embodiment.

Figure 7:
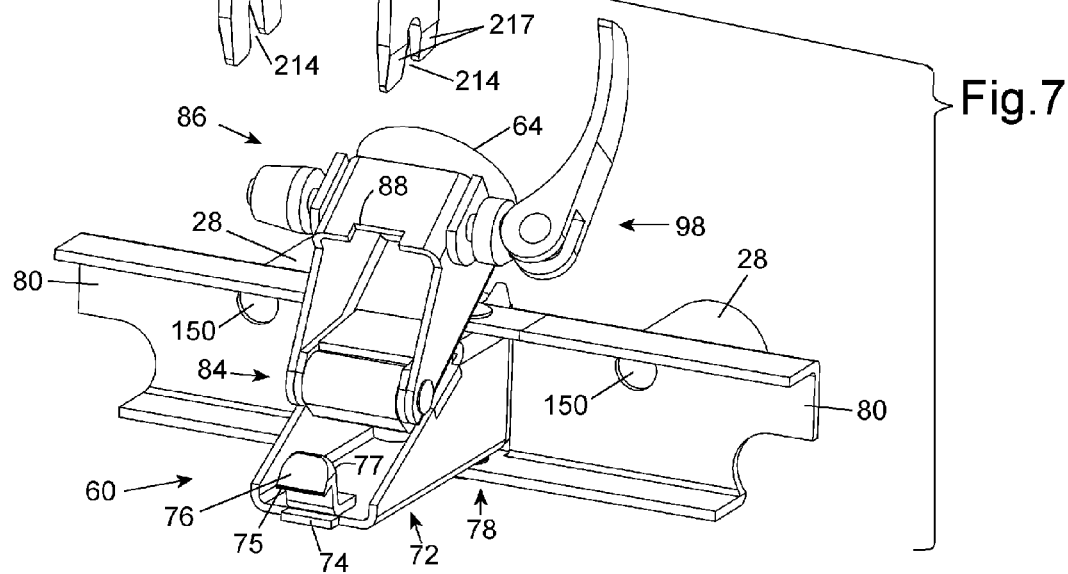

FIG. 7 Perspective view of the compound hinge in the folded configuration, first embodiment.

Figure 7A:
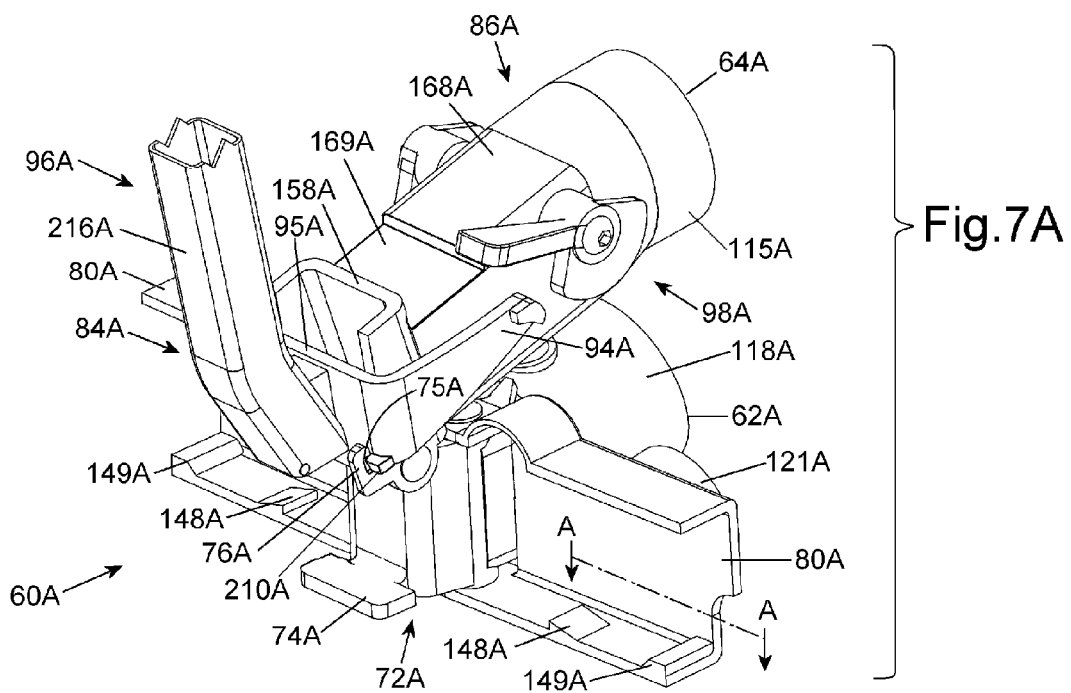

FIG. 7A Perspective view of the compound hinge in the folded configuration, another embodiment.

Figure 7B:
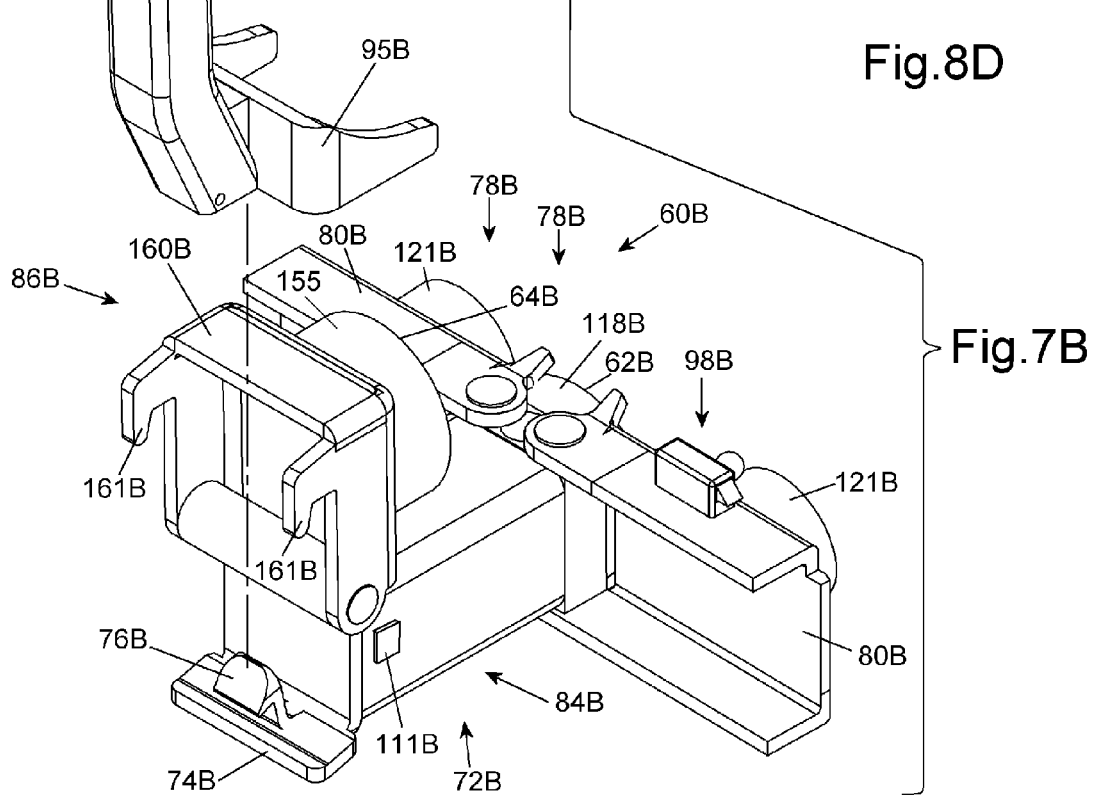

FIG. 7B Perspective view of the compound hinge in the folded configuration, yet another embodiment.

FIG. 8 Exploded perspective view of the compound hinge, first embodiment.

FIG. 8A Exploded perspective view of the compound hinge, another embodiment.

FIG. 8B Exploded perspective view of the compound hinge, yet another embodiment.

Figure 8C:
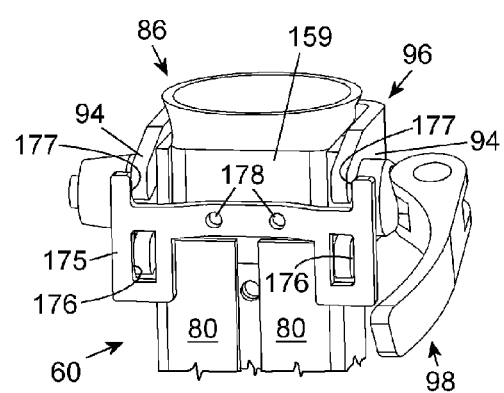

FIG. 8C Perspective partial view from below of the front portion of the compound hinge including the over-channel retainer.

Figure 8E:
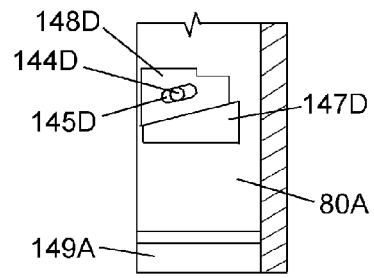
Figure 8F:
Figure 8D:
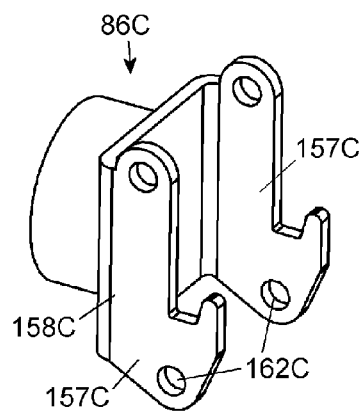

FIG. 8D Perspective view of another boom arm embodiment.

FIG. 8E Cross-sectional view of the lower forward portion of angular projection of FIG. 7A through line AA showing an alternative adjustable stop.

FIG. 8F Enlarged partial view of the left forward portion of the over-channel of FIG. 6A from line B-B showing the lug and the ramp.

Figure 9:
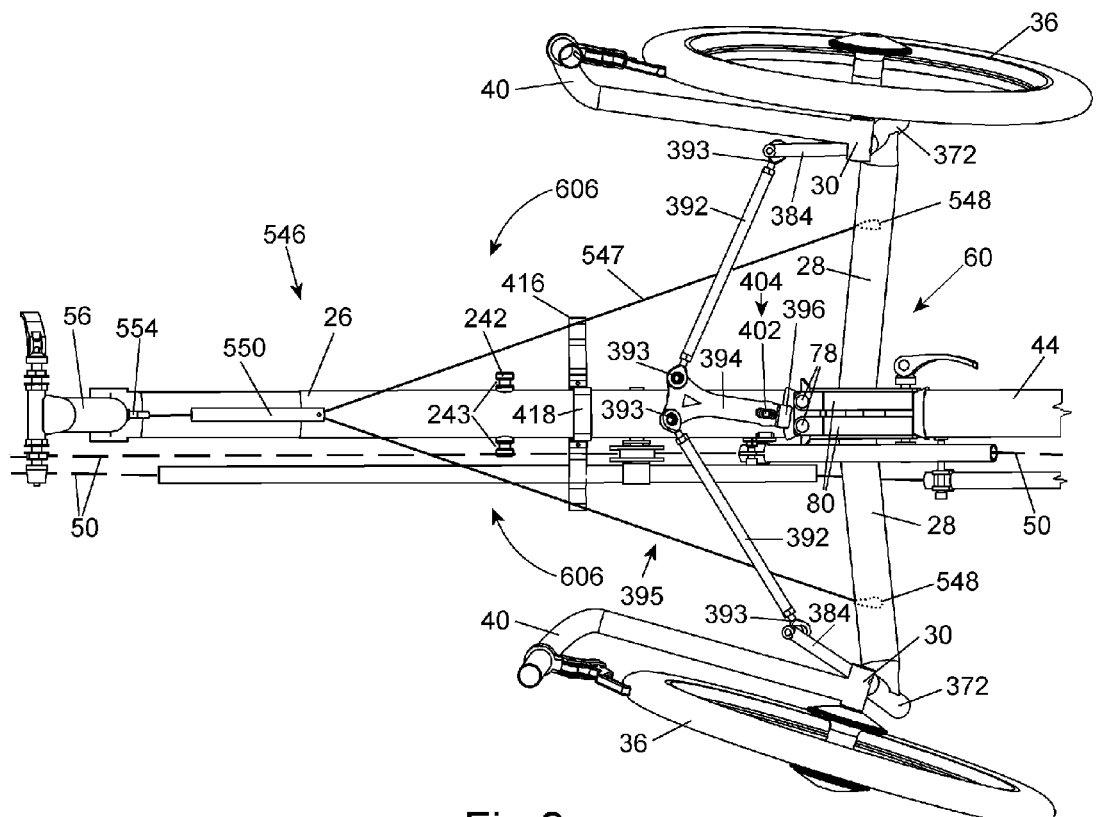

FIG. 9 Perspective partial view of a mid portion of the tricycle in the travel configuration with the front wheels steered slightly to the right. The seat assembly, the over-channel tie assembly, and wheel spokes are not shown for clarity.

Figure 10:
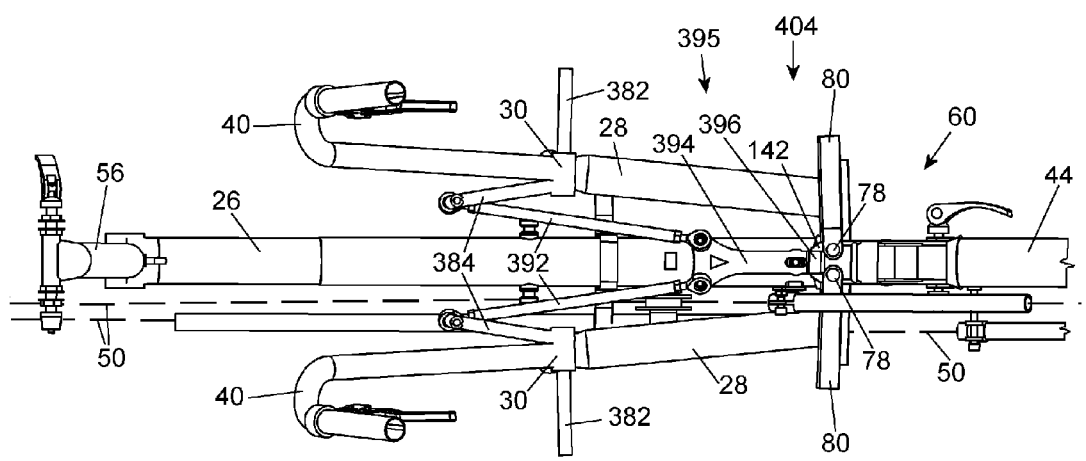

FIG. 10 Perspective partial view of a mid portion of the tricycle with the lateral arms stowed. The seat assembly, over-channel tie assembly, pull-cord and front wheels are not shown for clarity.

Figure 11:
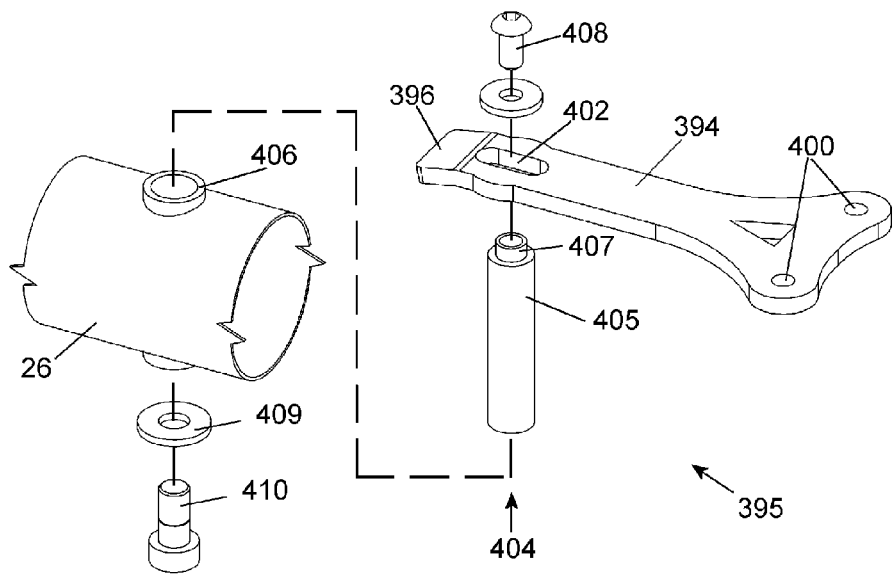

FIG. 11 Exploded perspective view of the radius arm assembly, first embodiment, showing a portion of the mainframe member.

Figure 11A:
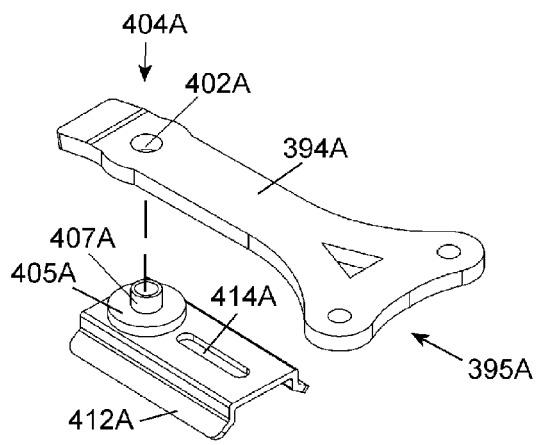

FIG. 11A Exploded perspective view of the radius arm assembly, another embodiment.

Figure 11B:
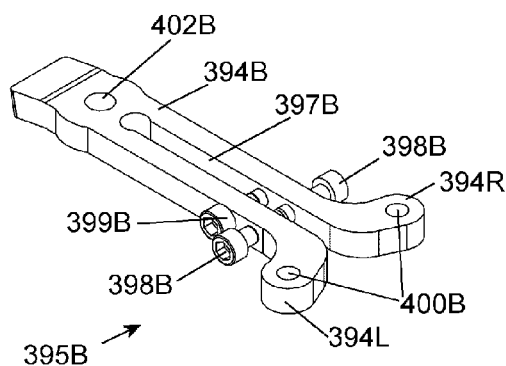

FIG. 11B Perspective view of the radius arm assembly, yet another embodiment.

Figure 11C:
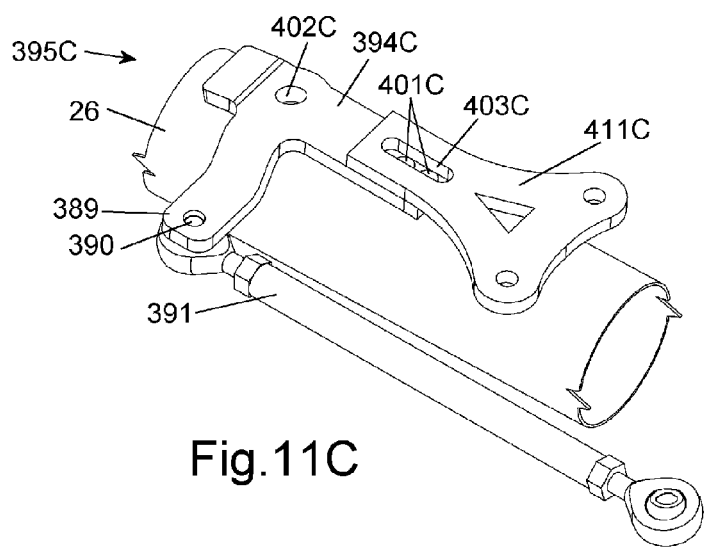

FIG. 11C Perspective view of the radius arm assembly, yet another embodiment, and including a steering link to connect to under-seat or push-pull steering (not shown).

Figure 12:
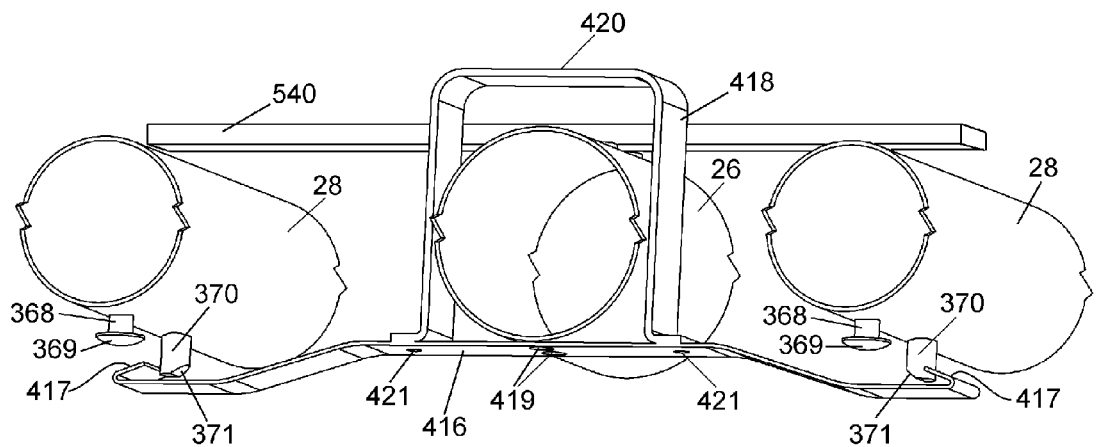

FIG. 12 Perspective view from the rear of the first embodiment of the lateral arm catch with the lateral arms stowed, showing only portions of the mainframe member and lateral arms for clarity.

Figure 12A:
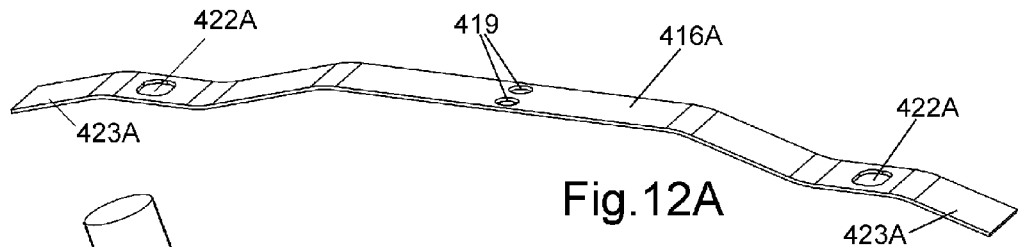

FIG. 12A Perspective view of the lateral arm catch, another embodiment.

Figure 12C:
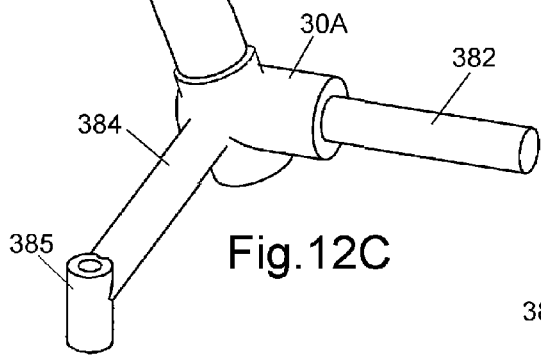
Figure 12B:
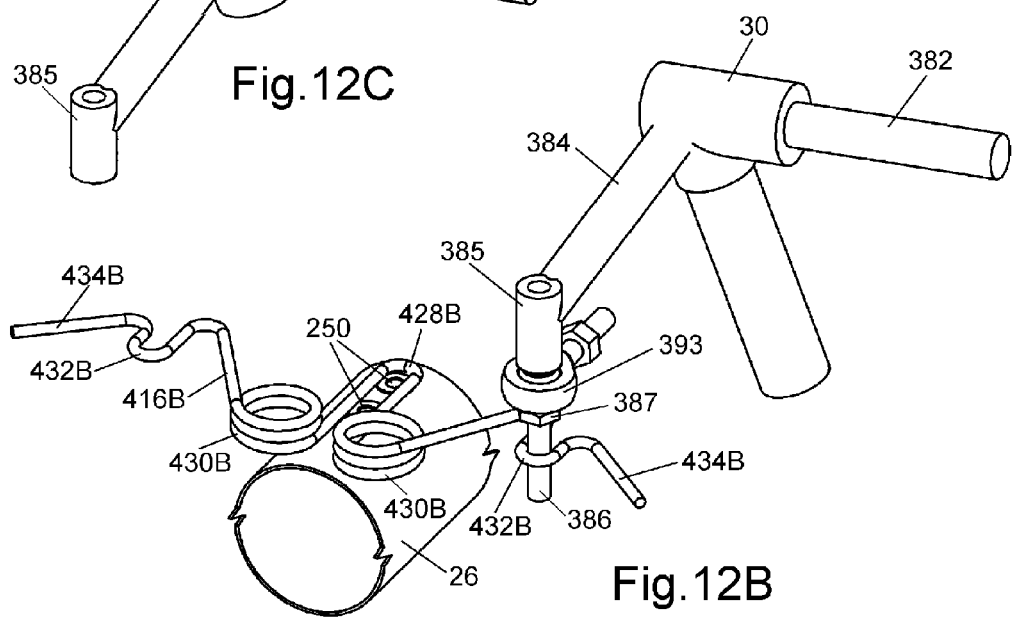

FIG. 12B Perspective view of the lateral arm catch, yet another embodiment, viewed from the rear, showing only a portion of the mainframe member and the right kingpin assembly for clarity.

FIG. 12C Perspective view of an inverted kingpin embodiment.

Figure 13:
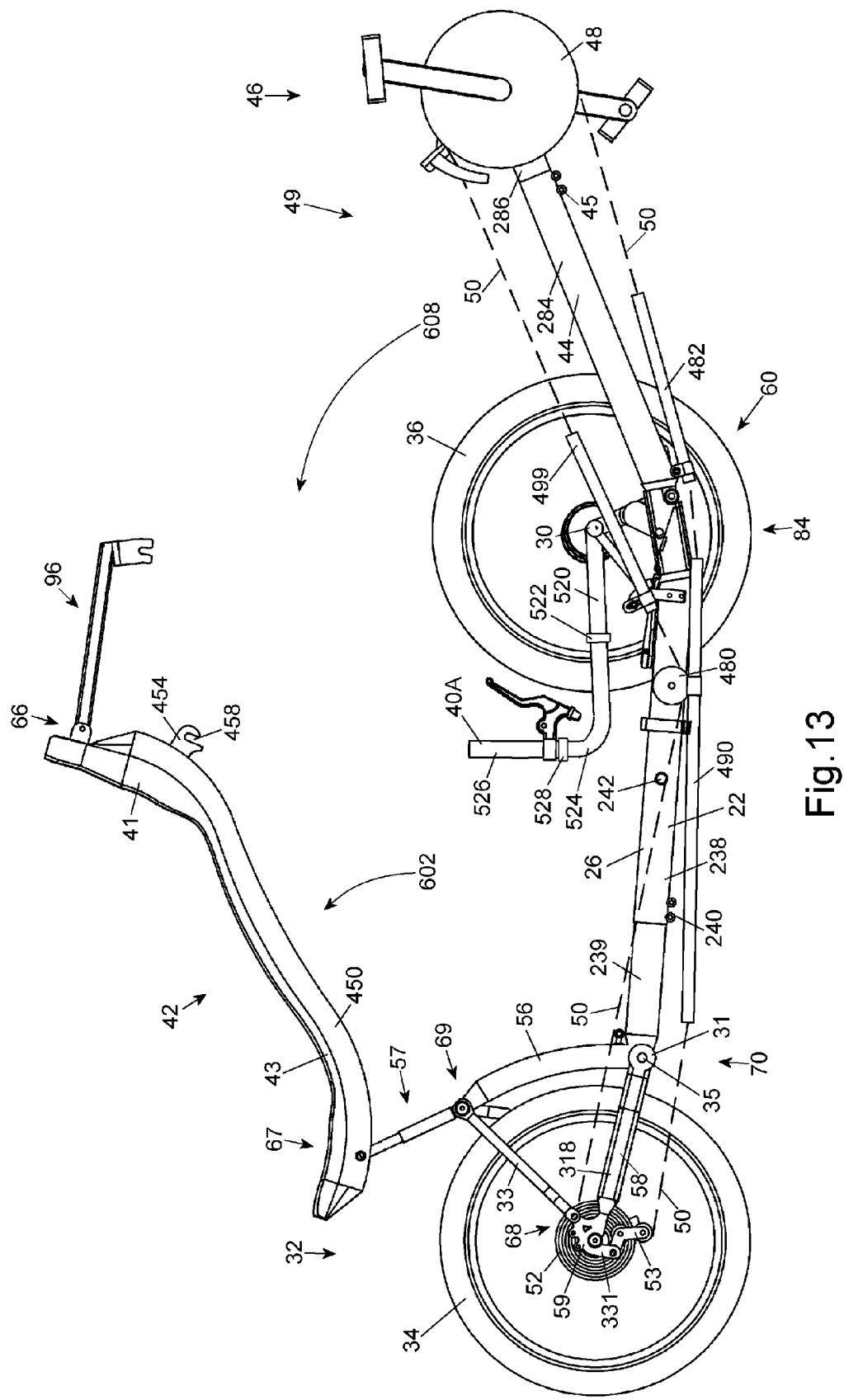

FIG. 13 Tricycle side elevation generally in the travel configuration except that the seat front and over-channel tie are raised. The wheel spokes, pull-cord, right lateral arm and its attachments are not shown for clarity.

Figure 14:
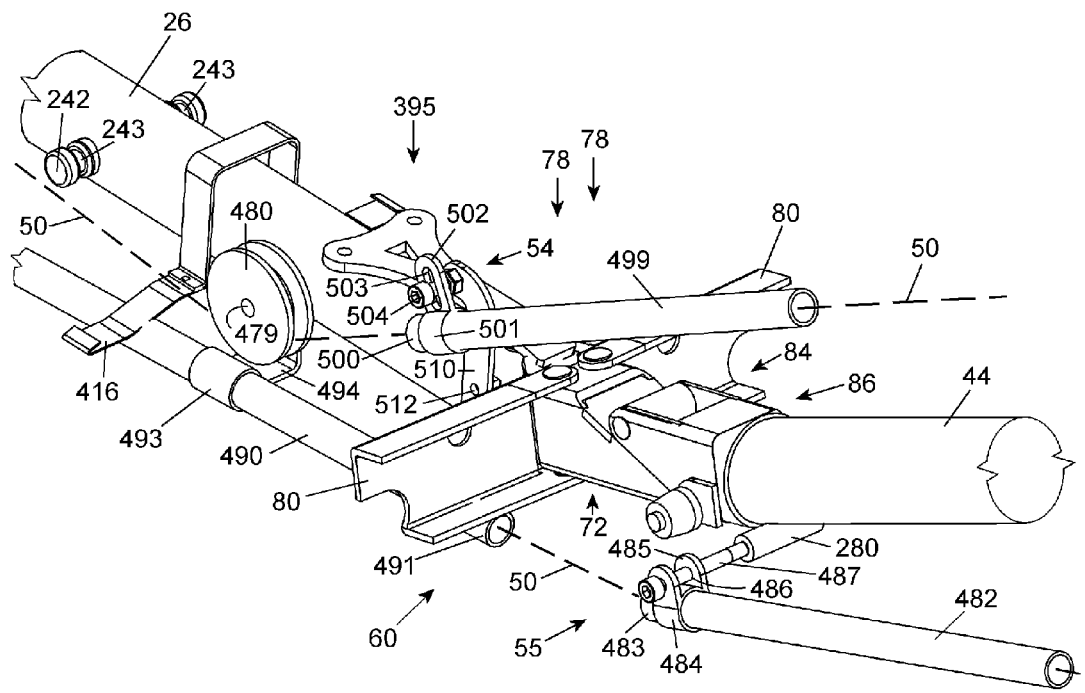

FIG. 14 Perspective partial view from the front left of a mid portion of the tricycle with the compound hinge in the stowed arm configuration showing some drive system parts. The lateral arms including attachments, linkage arrangement, seat assembly and over-channel tie assembly are not shown for clarity.

Figure 15:
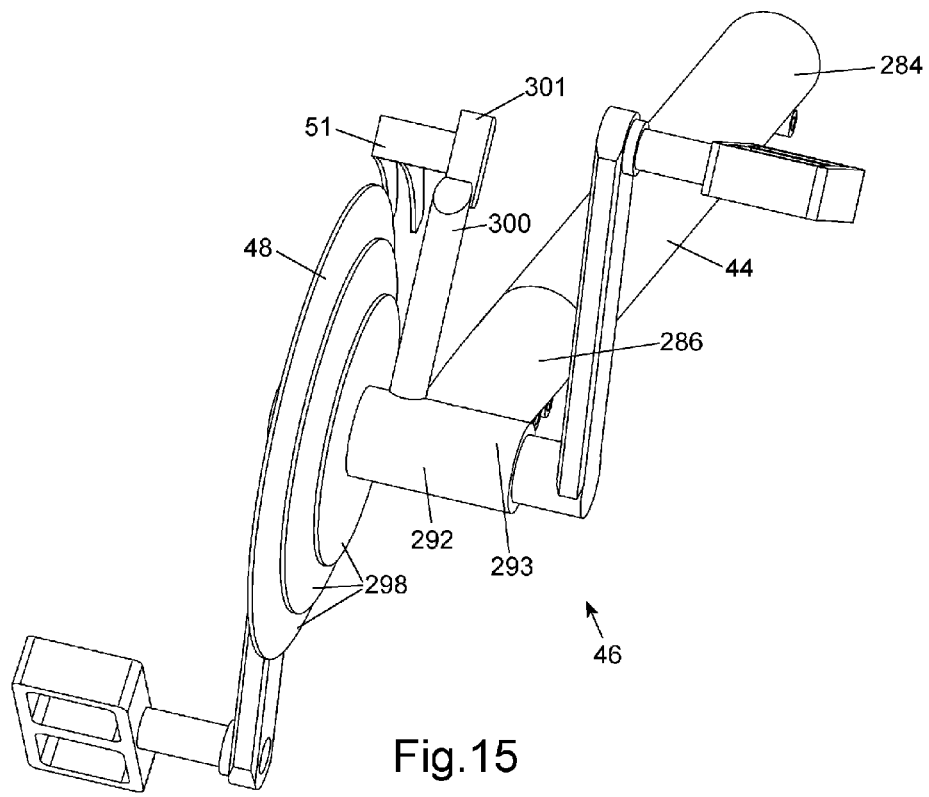

FIG. 15 Perspective partial view of the pedal crank assembly and boom showing the derailleur post.

Figure 16:
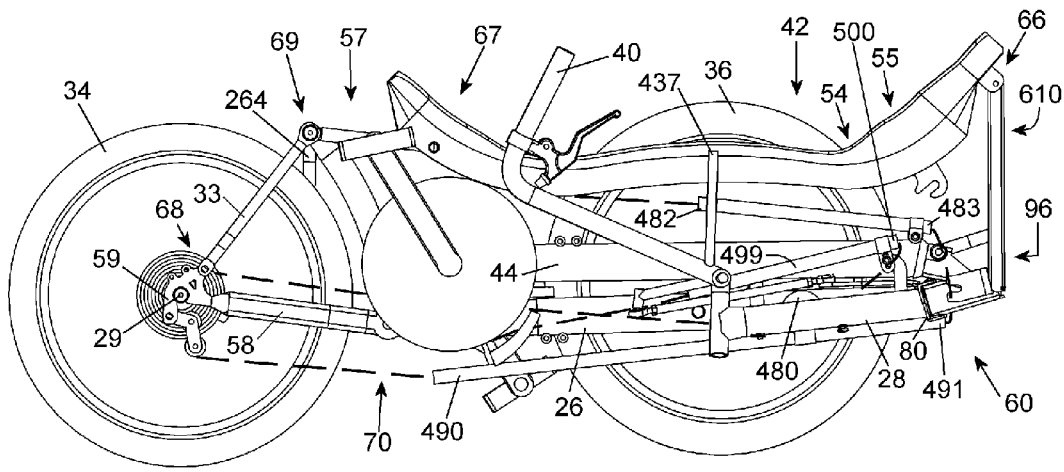

FIG. 16 Tricycle side view, compact fold configuration. The wheel spokes, pull-cord and the right wheel are not shown for clarity.

Figure 17:
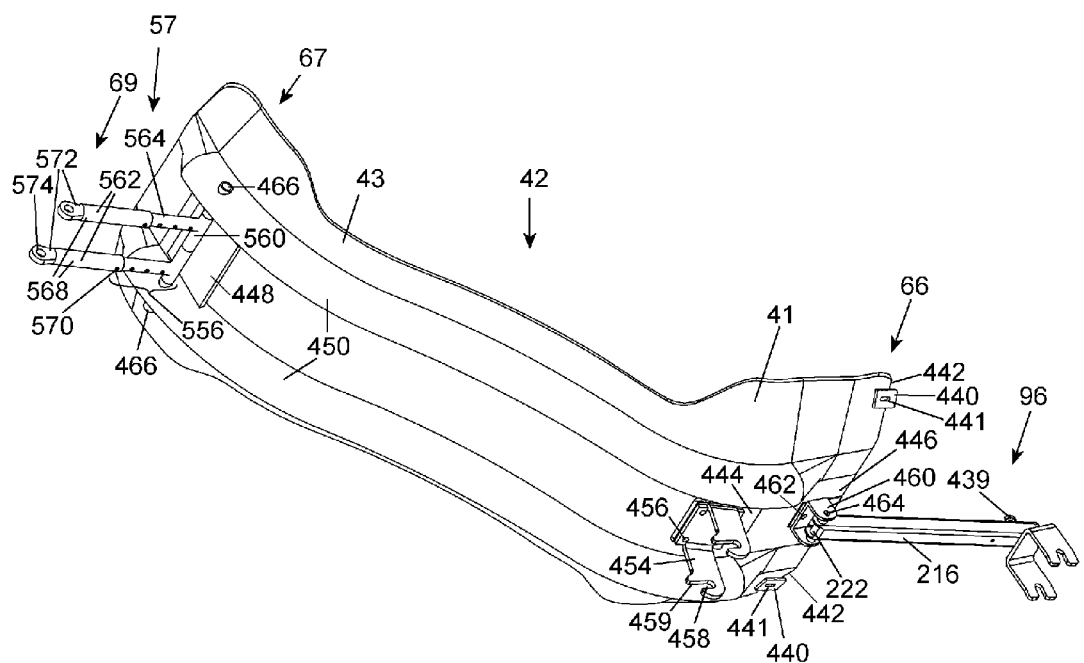

FIG. 17 Perspective underside view of the hardshell seat assembly and the attached over-channel tie.

FIG. 18 Perspective partial view, from the rear right, of the seat tube, seat tube pivot, seat arm and seat stay. Only a portion of the seat tube is shown for clarity.

FIG. 18A Perspective partial view, from the left rear, of the mesh seat assembly embodiment attached to the frame. Only a portion of the frame is shown for clarity.

FIG. 18B Perspective view of another seat arm embodiment.

FIG. 19 Perspective partial view from the rear left of the tricycle including the angled chainstay pivot embodiment, showing only the portion surrounding the chainstay pivot. The boom assembly, chain, chain sleeves, pull-cord and parts of the wheel, seat tube and spine are not shown for clarity.

FIG. 19A Diagrammatic representation from a similar perspective as FIG. 19 of the position and orientation of the chainstay pivot axis in the angled chainstay pivot embodiment.

FIG. 19B Perspective partial view from the rear of the tricycle including the angled chainstay pivot embodiment, showing only the chainstay pivot, chainstays, seat tube and spine. Other parts are not shown for clarity.

FIG. 19C Perspective partial view of the angled chainstay pivot embodiment from below with the tricycle front to the left of the figure; showing only the chainstay pivot, chainstays, spine and the seat tube. For clarity other parts are not shown and the upper portion of the seat tube is shown with dashed lines.

FIG. 20 Perspective view of a compound hinge with a cutout to reveal the inside of the tie and the locking device. The rear portion of the tie is not shown for clarity.

FIG. 21 Perspective partial view of yet another compound hinge. The rear portion of the tie and our portions of the lateral arms are not shown for clarity.

DETAILED DESCRIPTION

Generally, and with reference to FIG. 1, a tricycle 20 according to one exemplary embodiment includes a frame 22 with a spine 26 along a central axis 24, supported by a rear wheel 34 and a pair of steerable front wheels 36. When viewed from the rear the tricycle has a left side and a right side. A pedal boom 44 extends forwardly of the spine 26 and supports a pedal crank assembly 46. A seat assembly 42 is supported by the spine 26. Seat assembly 42 includes a seat base portion 41 for the rider to sit upon and a seat back portion 43 for the rider to rest their back. The front wheels 36 each support a lateral arm 28 having a proximal end and a distal end with the front wheel pivotably attached at the distal end and an angular projection 80 attached at the proximal end. A lateral arm pivot 78 connects each angular projection 80 to the spine and allows the lateral arms 28 to fold from a travel position with distal ends spaced from the spine 26 (as shown in FIG. 9) to a stowed position alongside the spine 26 creating a stowed arm configuration (as shown in FIG. 10 and FIG. 2). In that configuration the attached front wheels 36 have moved to a stowed position alongside the spine 26 (as shown in FIG. 2). Clamping means (described in detail later) on the spine 26 arrests the angular projections 80 in the travel position and releases the angular projections to allow folding of the lateral arms to their stowed position.

Frame 22 can be made of tubing of the various shapes and materials used in bicycle frames. One or more chain stays 58 extend from the rear of spine 26, and are supported by the rear wheel 34. The chain stays 58 and the rear wheel 34 combine to form a rear assembly 32.

The distal end of each lateral arm 28 has a kingpin arrangement 30 for attaching and steering the front wheel 36. A handlebar 40 can be attached to each kingpin 30 for orienting the front wheels. The handlebars in co-operation with the kingpins and front wheels comprise a steering means for the vehicle. Each handlebar can also support a brake lever 530 and other equipment such as gear shifters (not shown). Other embodiments (not shown) can use other common steering means known to those in the art as under-seat steering or push-pull (or tractor) steering or joystick steering. A linkage arrangement 38 extends between the kingpins 30 for maintaining the front wheels 36 at a controlled near parallel orientation.

A drive system 49 connects the crank assembly 46 with the rear wheel 34. The pedal crank assembly 46 accommodates a conventional crank-type pedal arrangement with an attached drive sprocket set 48. The drive system includes a drive chain 50, schematically represented by a dashed line, that connects and transfers power from drive sprocket set 48 to a rear wheel sprocket set 52 attached to the rear wheel 34. As can be appreciated by those in the art the crank assembly can include including folding pedals (not shown) or detachable pedals (not shown). In another embodiment (not shown) drive system 49 can also be a belt drive system. Frame 22 can include holes (not shown) to route brake and gear cables through the frame or guides (not shown) to hold the cables on the outside of the frame or both.

Means for Collapsing

The frame 22 also includes several means to allow collapsing of the tricycle 20 and the frame from the operational or travel configuration to collapsed or folded configurations and to return to the travel configuration. For each means a description of the orientation of parts in their position for the travel configuration is followed by a description of the orientation of parts in their position for folded configurations.

The frame 22 firstly includes compound hinge 60 substituting for a portion of spine 26 at the junction with the lateral arms 28. Compound hinge 60 pivotably attaches lateral arms 28 to spine 26 and permits the lateral arms to be folded to their stowed position. Compound hinge 60 can also pivotably attach boom 44 to spine 26 and permit the boom to be folded from a travel position (as shown in FIG. 13) to a folded or stowed position generally parallel with the spine (as shown in FIG. 16). Additionally compound hinge 60 can include a means (described in detail later) to selectively hold the front of seat 42 to the spine.

The compound hinge 60 can be made in many embodiments and there is no one preferred embodiment, each embodiment having features with advantages for different applications dependant on manufacturer's priorities including manufacturing cost, weight or size. For instance one embodiment could be used for a budget tricycle and another embodiment for a racing recumbent tricycle and yet another embodiment combining parts from different embodiments for yet another tricycle. Several embodiments will be described here beginning with the embodiment shown in FIG. 6, FIG. 7 and FIG. 8. Each embodiment provides a folding mechanism that is compact in the travel position to allow the inclusion of performance frame geometry and an efficient drive system.

Compound Hinge General

Referring to FIG. 1, the compound hinge 60 has a central axis 61 co-linear with frame central axis 24 when viewed from above. Referring also to FIG. 6, FIG. 7 and FIG. 8, the compound hinge comprises a main arm assembly 72 attached by its rear end 62 to spine 26. Main arm assembly 72 is further pivotably connected to a boom arm assembly 86 by a boom pivot assembly 84 permitting rotation of the boom arm in a vertical plane when collapsing frame 22. Boom 44 is attached to and supported by the front end 64 of boom arm assembly 86. Thus boom pivot 84 is between the boom 44 and the spine 26 and allows the boom to fold back from a travel position forward of the spine to a stowed position against the spine.

The rotational axis of boom pivot 84 is generally horizontal and perpendicular to central axis 61 but can have a small angular offset (not shown) in the horizontal plane to cause the boom 44 to fold back to the right side of frame 22, providing greater clearance in the folded position between the frame and crank assembly 46. The rotational axis of boom pivot 84 can also have a small angular offset (not shown) in the vertical plane, to cause the boom 44 to rotate as the boom is folded back so the then lower part of the crank assembly is further to the right, again providing greater clearance between the frame and crank assembly. The angular offsets can be useful when crank assembly 46 includes a front derailleur 51. Angular offsets of less than one degree can be sufficient for the front derailleur to clear the spine when the boom is folded to the stowed position.

Any movement of the boom 44 during tricycle operation can waste rider energy and preferentially should be minimised. The riders pedalling action causes strong forces on boom 44 and boom arm 86 including downward forces and sideways forces and rotational forces generally around the axial centreline of the boom 44. A tongue 74 on front of the main arm assembly 72 engages with a congruent recess 88 on the boom arm 86, said engagement providing resistance to such forces when the tricycle 20 is in its travel configuration.

Angular projections 80 partially enclose and in the travel configuration can embrace the sides of main arm assembly 72. In this embodiment the angular projections are shown as having a channel shaped section but can have various other shapes (not shown), including having curved sides, and still provide the same function. Each projection is pivotably connected by a lateral arm pivot assembly 78 to the main arm assembly 72 permitting rotation of the projections in a generally horizontal plane. The projections can rotate from the travel position shown in FIG. 6 to the stowed position shown in FIG. 7. When tricycle 20 is in its travel configuration, channel section member or over-channel 95 is positioned over and partly encloses the front portion both of angular projections 80. The over-channel has two sides 94, which in the travel configuration together arrest both angular projections 80 from pivoting movement. A fast-operating fastener or locking device 98 selectively secures the over-channel in the travel position.

The lateral arms 28 are attached to the outer sides 82 of the angular projections 80. Thus the angular projections 80 in co-operation with lateral arm pivot assemblies 78 provide a folding means to retract the lateral arms 28 with respect to the frame 22. The lateral arms 28 can be attached at an angle to the normal of outer sides 82 to position the front wheels at a predetermined vertical offset or an offset along hinge central axis 61 relative to the compound joint and thereby the frame. These offsets can be used to set the height of the front of the frame and the forward angle of the lateral arms to the frame, also known as "sweep". When tricycles are ridden, bumps on the road can cause large forces at the junction of the lateral arms 28 and spine 26 and any relative movement in these parts can cause tricycle steering problems and instability. As can be seen in the overlaying of the components of the compound hinge 60 each layer reinforces the underlying layer. The angular projections 80 overlay and reinforce the boom arm 86, the over-channel 95 overlays and reinforces the angular projections 80. The weight of tricycles is also of prime importance and, as can be appreciated, the overlaying reinforcement of parts in compound hinge 60 can allow the hinge to be made lighter for the same strength.

Compound Hinge Detail

As shown in FIG. 6, FIG. 7 and FIG. 8 the main arm assembly 72 in this embodiment includes a tubular member 100 made from square hollow section tube with a transition to round cross-section at the rear end to facilitate smooth attachment to spine 26 when the member is of generally round tube. This tubular member and other tubular members listed hereinafter can have alternative cross-sectional shapes (not shown), and this transition and other transitions listed hereinafter can transition between the various tube cross-sections and can be omitted where the cross-sections are compatible. The transitions can be formed by various methods known to those skilled in the art including moulding or casting or pressing to shape. Alternately the transition can be included in the connecting end of the spine 26.

As part of lateral arm pivots 78, sleeves 114 extend through holes 113 in tubular member 100 providing a large wear surface for a mating lateral arm pivot pin 120. Angular projection 80 has upper and lower flanges. The flanges can be of equal thickness or the upper flange can be thinner to reduce weight. Each pin is fitted into mating holes 132 in the upper and lower flanges of angular projection 80 and fixed at one end or both such that the pin cannot rotate in the holes. The fixing (not shown) can be accomplished by using an interference fit between the pin and the hole(s), or adding a knurl on the pin where it passes through the hole, or including a flat on the side of one pin head plus a mating tang on the upper flange of the projection or by various other means known to those familiar with making such pivots.

Pivot pins 120 can be of one of the many forms used in hinges or, if easy separation is required, can be can be of one of the many removable forms (not shown) including a shoulder bolt plus lock nut, or a common bicycle seat bolt which in one form is effectively a male threaded shoulder bolt mating with a female threaded shoulder bolt.

Tubular member 100 has an inclined forward end 104 to provide a horizontal distance between boom pivot 84 and tongue 74. The distance provides greater leverage to reduce forces at the boom pivot 84 and allows a smaller boom pivot. A boom pivot hinge plate 110 has tangs 112 on each side and its forward end is formed into a sleeve 115. Tangs 112 are fixed into congruent recesses 108 on tubular member 100. As part of boom pivot 84, sleeve 115 provides a large wear surface for a mating pivot pin 156. A catch 76 is attached to tubular member 100 above tongue 74.

This embodiment of the boom arm 86 includes a tubular member 168 made from square hollow section tube with a transition to round cross-section at the front end 64 to facilitate smooth attachment to boom 44 when the boom is of generally round tube. Alternately the transition can be included in the connecting end of the boom 44. Tubular member 168 includes holes 164 through which is fixed pivot pin 156 as part of boom pivot 84. Fixing of the pivot pin, like that described for lateral arm pivot pins 120, at one end or both ends prevents rotation of the pin in the holes. Tubular member 168 has an inclined rear end 170 congruent with the forward end of tubular member 100, and recess 88 which engages with tongue 74 on the main arm assembly 72 in the travel position.

A pair of reinforcement plates 182 is fixed on the inner surface of the rear portion of tubular member 168 and has matching edges and cutouts, and can be fixed to the tubular member typically by brazing or welding. Alternately, they can be increased thickness (not shown) in the sides on the tubular member and can be created by some forms of fabrication, including casting. The top rear surface 174 of tubular member 168 is angled down to reinforce the area of the tubular member near holes 164 and provide clearance when the boom arm 86 is folded back against tangs 112.

Locking device assembly 98 is fitted through holes 183 in the sides of tubular member 168 at a location coinciding with the front end of the projections and when locked in the travel position the locking device restrains the projections from pivoting away from the sides of main arm assembly 72. Additionally, in the travel position, sides 94 of over-channel 95 can fit between the angular projection 80 and locking device 98. In the travel position, locking device 98 can clamp the over-channel sides 94 against the angular projections 80 thereby providing additional reinforcement to compound hinge 60 in the travel configuration and taking up any gap that might occur.

Optionally locking device 98 can include a convex washer (not shown) that presses into a concave recess (not shown) on the side of over-channel sides 94 when engaged thereby providing resistance to vertical sliding of the over-channel. In the travel position over-channel 95 also restrains the angular projections 80 from pivoting away from the sides of main arm assembly 72. Locking device 98 is shown in this embodiment as a standard bicycle "quick release" but may be of any suitable type that compresses axially. The lower portion of sides 94 of over-channel 95 can have a tapered thickness forming ramp surface 217 on the outer sides. The ramps 217 can provide a lead-in to help guide the sides 94 into locking device 98.

In the travel configuration slots 214 in the sides 94 of over-channel 95 engage axle 186 of locking device 98. Locking device 98 can include a means to centralise the device in boom arm 86 when the locking device is released. This may take many forms and the embodiment shown includes a collet 185 press fitted centrally on axle 186 with coil springs 187 on each side to press against the inner sides of the boom arm 86. The holes 183 in tubular member 168 also locate tabs 180 that are fixed to tubular member 168, and engage with a congruent cutout 136 in angular projection 80 when in the travel position. The tab provides a supported level surface for the clamping force of locking device 98 through over-channel sides 94.

Thus over-channel 95 in co-operation with locking device 98 comprise a clamping means on the spine to arrest the angular projections 80 in the travel position and release the angular projections to allow folding of the lateral arms 28 to their stowed position. Also, over-channel 95 provides the jaws of a manual clamp and the angular projections 80 move in and out of the jaws. The boom pivot 84 can be part of the compound hinge 60 and the clamping means can arrest the boom 44 in the travel position.

Hinge Folding

The folded configuration of compound hinge 60 is shown in FIG. 7. Compound hinge 60 can be folded from the travel configuration of FIG. 6 to the folded configuration of FIG. 7 as follows. First, locking device 98 is released. Next, over-channel 95 is raised clear of the angular projections 80. Next, angular projections 80 are rotated around pivots 78 out to their folded configuration generally normal to hinge central axis 61. Next, boom arm 86 is rotated around pivot 84 and up and over main arm assembly 72. In this embodiment the boom arm can rotate approximately 150 degrees, sufficient for the boom 44 to be folded generally parallel with spine 26 when other angles in the frame are included. Each angular projection 80 includes a cutout 134 (see FIG. 8) for clearance in the folded configuration for main arm assembly 72, and recess 150 (see FIG. 7) for clearance in the travel configuration for the head of boom pivot pin 156.

In another embodiment (not shown) meshing spur gears can be fitted to angular projections 80 at pivots 78 so that both angular projections 80 rotate in synchronism.

A tubular tie 216 extends rearward and upward from the section top face 208 of over-channel 95 as part of over-channel tie assembly 96. Referring to FIG. 17 the distal end of tie 216 supports a sleeve 222 that is part of an over-channel tie pivot assembly 66, described in detail later. Pin 224 is fixed across the top of the forward opening of tie 216. A spring 226 made from flat material is located on the lower inside of tie 216 with its front edge level with the front open end of the tie 216 and its rear end fastened (fastener not shown) to the lower inside of the tie. In a folded seat configuration tie 216 is generally vertical and fits over catch 76 with pin 224 captured under a lip 75 on the catch and spring 226 pushing the tie away from the back 77 of catch 76 thereby holding pin 224 under lip 75. Pin 224 may be simply disengaged from catch 76 by pulling tie 216 forward to compress spring 226 which permits pin 224 to pass lip 75 and tie 216 to be lifted off catch 76. Pin 224 and spring 226 thereby combine to form a detent that allows the tie to engage on catch 76.

FIG. 8C shows a perspective partial view from below of the front portion of the compound hinge. Referring to that figure, the compound hinge 60 can include an over-channel retainer 175 supporting on each end restraining surfaces 176 and 177 that prevent any outward lateral movement of the lower end of over-channel sides 94 if the locking device 98 is not locked. This embodiment of retainer 175 is laser cut plate having a central section with two holes 178 and supporting two "P" shaped ends that include the restraining surfaces 176 and 177. The retainer is attached via fasteners (not shown) through holes 178 to mating holes (not shown) in the lower face 159 of the boom arm 86. The "P" shaped ends are offset downwards to provide clearance for the angular projections 80 to move freely between their stowed and travel positions.

Another Compound Hinge Embodiment

Another embodiment of the compound hinge is shown in FIG. 6A, FIG. 7A and FIG. 8A. This embodiment 60A includes sockets or lugs to facilitate connections to the other frame parts by a common bicycle fabrication method called lugged frame construction wherein each mating frame tube is brazed into a lug.

Main arm assembly 72A differs from the first compound hinge embodiment 60 in that the assembly includes a sleeve plate 101A that further includes a generally vertically oriented channel 110A that supports at each distal end of each flange a sleeve 114A, and supports at its upper end sleeve 115A, and at the lower end a tongue 74A. Sleeve plate 101A can be variously fabricated by joining separate parts or by stamping and rolling from a flat plate or by casting or molding or forging methods as is common practice in fabricating hinges. Tubular member 100A is attached to the rear of sleeve plate 101A with holes 117A congruent with the outer surface of sleeves 114A. Tubular member 100A has a square hollow section shape at its front transitioning to a circular shape at the rear, the axis of the rear portion optionally being inclined at an angle to the compound hinge central axis 61A and form a socket or lug portion 118A for attaching to spine 26. Tubular member 100A also optionally includes a sleeve 406 fitted through the member as pivot sleeve for a radius arm pivot assembly 404 (see FIG. 11), described in detail later.

Boom arm assembly 86A differs from the first compound hinge embodiment 60 in that the assembly includes a channel 158A having in the upper flange portion holes 164A supporting pin 156A of boom pivot assembly 84A. The left flange (right side in figures) of channel 158A extends behind hole 164A to support a hook or catch 76A which extends rearward then downward and finally forward to create a lip 75A. A tubular member 168A is attached to the front face of channel 158A. The member has a square hollow section shape transitioning to a circular shape at the forward end, the axis of the front portion optionally being inclined at an angle to the compound hinge central axis 61A to form a socket or lug portion 155A for attaching boom 44.

Angular projections 80A differ from the first compound hinge embodiment 60 in that a portion of the upper flange of each projection has a bowed portion 146A to clear boom pivot 84A in the travel configuration. Each angular projection 80A also supports a lug 121A for attaching the associated lateral arm 28. Angular projections 80A also include a ramp shaped stop 148A on the inner lower flange that engages the lower face 159A of channel 158A in the travel configuration, ensuring that channel 158A is held firmly against tongue 74A providing added rigidity to the compound hinge 60A. Angular projections 80A can also include a spacer tab 149A on the inner lower flange that ensures a gap is maintained between the lower flange and the boom arm assembly 86A when in the travel configuration. The rear underside portion of tubular member 168A can include a recess 169A to provide clearance for stops 148A.

FIG. 8E shows a cross-sectional view of the lower forward portion of one angular projection 80A of FIG. 7A, through line AA, showing an alternative stop that is adjustable. This stop is shown in one angular projection but can be included in both. A thin plate 147D has an angular rear end and is rigidly attached to the lower flange of the angular projection. Adjustable stop 148D is also thin plate, and has an angular forward end and includes a slot 145D. Angular projection 80A can include a hole 144D and a fastener (not shown) through that hole and slot 145D can secure adjustable stop 148D to the angular projection. The stop can be adjusted within the range of the slot to remove any gap between the stop and channel 158A in the travel position.

Lateral arm pivots 78A are formed by lateral arm pivot pins 120A extending through sleeves 114A, providing a large wear surface for pivoting. Each pin is fitted into mating holes 132A in the upper and lower flange of angular projection 80A and fixed at one end or both such that the pin cannot rotate in the holes. In other embodiments (not shown) the spacing between lateral arm pivots 78A can be increased to situate the pivots outside the sides of spine 26.

Over-channel tie assembly 96A and over-channel 95A differ from the first compound hinge embodiment 60 in that the over-channel has two sides 94A that taper towards their distal ends and support a tab 212A with curved surface 213A. Also, a small lug 210A is attached to the left forward edge (right side in figures) of the upper surface of over-channel 95A. As shown in FIG. 7A, in the folded seat configuration over-channel tie 216A can be generally vertical with lug 210A engaged under the lip 75A of catch 76A. The tie includes a bend intermediate its length to provide clearance from channel 158A in that configuration. When the seat base is not secured to the spine, the lightweight construction and length of seat 40 provides an inherent spring action whereby the front of the seat can be pushed down slightly on one side and, when released, will return to its normal position. As will be described later in detail the over-channel tie assembly is pivotably attached to the seat to allow the tie to rotate up and down.

Thus, when over-channel tie 216A is generally vertical, over-channel 95A can be easily pushed slightly to the left or right side and, as a result of the spring action in the seat, will return to the central position when released. And thus, over-channel 95A can be pushed slightly to the left for lug 210A to travel freely up or down to the left side of catch 76A. When the over-channel 95A is then released, lug 210A can engage in catch 76A under lip 75A. FIG. 8F is an enlarged partial view from line B-B of FIG. 6A of the left forward portion of the over-channel, showing the lug 210A. Lug 210A can include a ramp 220A to assist guiding the lug along the side of catch 76A. Pushing downwards on tie 216A, without the user applying any lateral force, ramp 220A can guide the over-channel 95A to the side of catch 76A and the lug will then automatically engage in catch 76A under lip 75A. Lug 210A can be disengaged from catch 76A by pushing tie 216A to the left side before lifting. Lug 210A and the spring action of the seat thereby combine to form a detent that allows the tie to engage on catch 76A.

Locking device 98A differs from the first compound hinge embodiment 60 in that the locking device is of the type known as cam lever or cam lock and includes ramped surfaces 196A on cams 194A and 195A connected and constrained to synchronously rotate together by axle 198A. In this embodiment the locking device has an axle 198A with square ends 200A that engage into square sockets 201A on cams 194A and 195A. The distance between ramped surfaces 196A can be adjusted by adjusting screw 202A. Locking device 98A also includes a handle 193A. Rotating locking device 98A by handle 193A rotates ramped surfaces 196A and can pull angular projections 80A firmly against boom arm 86A thereby providing additional reinforcement to the compound hinge 60 in the travel configuration and taking up any gap that might occur.

Thus ramped surfaces 196A on locking device 98A in co-operation with over-channel 95 comprise a clamping means on the spine to arrest the angular projections 80 in the travel position and release the angular projections to allow folding of the lateral arms 28 to their stowed position. Also ramped surfaces 196A provide the jaws of a manual clamp and the angular projections 80 move in and out of the jaws. The boom pivot 84A can be part of the compound hinge 60A and the clamping means can arrest the boom 44 in the travel position.

Hinge Folding

In this embodiment the boom arm can rotate approximately 180 degrees, sufficient for the boom 44 to be folded generally parallel with spine 26. In the travel configuration handle 193A is oriented near horizontal, causing ramped surfaces 196A to clamp over-channel sides 94A and also angular projections 80A. The outer radius surface 197A of the cam additionally engages with curved surface 213A of over-channel 95A to prevent the over-channel lifting from the angular projections 80A.

To move to the hinge folded configuration handle 193A is oriented near vertical providing clearance for the over-channel 95A to move generally vertically and angular projections 80A to rotate generally horizontally.

Yet Another Compound Hinge Embodiment

Yet another embodiment of the compound hinge is shown in FIG. 6B, FIG. 7B and FIG. 8B. This embodiment 60B has boom pivot 84B at the forward end of the compound hinge.

Main arm assembly 72B differs from the first compound hinge embodiment 60 in that the assembly includes sleeve block 114B that further includes holes 113B that provide a large wear surface for mating lateral arm pivot pins 120B as part of lateral arm pivots 78B. Block 114B also includes hole 119B to reduce the weight of the block and although this hole is shown circular it can have other shapes (not shown). Lug 118B extends from the rear of this block for attaching to spine 26.

Tubular member 100B is attached to the front face of block 114B. The tube is shown as square hollow section but can be of other shapes (not shown). The forward end of tubular member 100B is attached to sleeve plate 101B that supports at its upper end sleeve 115B, and at the lower end supports a tongue 74B. Sleeve plate 101B has a recess 107B on each side, and each recess receives a tongue 138B on angular projection 80B when the projections are in their travel position. Sleeve plate 101B can be variously fabricated by joining separate parts or by cutting or stamping and rolling from a flat plate or by casting or molding or forging methods as is common practice in fabricating hinges. A pad 111B can be attached to the forward end of each side of tubular member 100B to provide a cushion for angular projections 80B. Pads 111B can be made of many materials including elastomer, and attached by an adhesive.

Boom arm 86B differs from the first compound hinge embodiment 60 in that the assembly includes channel 158B having, in the upper portion of sides 157B, holes 164B used by boom pivot 84B. Tongue 74B on the main arm assembly 72B engages with congruent recess 88B on the boom arm 86B. Each channel side 157B has a hook 161B at the lower rear end. Plate 160B encloses the lower end of channel 158B joining the lower ends of the sides 157B to the lower face 159B. The plate provides increased strength to the channel sides 157B to resist outward forces on the angular projections 80B during operation. Extending forward from channel 158B is socket or lug 155B for attachment of boom 44.

Another boom arm embodiment, 86C is shown in FIG. 8D that can be substituted for boom arm 86B. Boom arm 86C differs from boom arm 86B in that it includes a channel 158C having longer channel sides 157C each including a hole 162C at its lower end, and there is no plate enclosing the lower end of the channel. A fastener (not shown) can be fitted through holes 162C and tightened to close the gap between the two sides 157C thereby providing adjustment of the clamping of angular projections 80B when the boom arm is moved to its travel position.

Angular projections 80B differ from the first compound hinge embodiment 60 in that they include on their forward edge tongue 138B described above. The outer edge of the tongue includes a chamfer 139B as a guide for sides 157B of boom arm assembly 86B when the boom arm rotates towards the travel position and the sides enclose the tongues 138B of the angular projections 80B. This mechanism thereby clamps the projections to main arm assembly 72B thereby providing additional reinforcement to the compound hinge 60 in the travel configuration and taking up any gap that might occur. Angular projections 80B also support lugs 121B for attaching lateral arms 28.

Over-channel tie assembly 96B and over-channel 95B differ from the first compound hinge embodiment 60 in that the over-channel has sides 94B that are tapered towards their distal ends and in the travel configuration each end engages with a congruent recess in hooks 161B of boom arm 86B. In the travel configuration this engagement prevents the boom arm 86B lifting and rotating about boom pivot 84B.

In some embodiments (not shown) another difference can be that the front edges 93B of sides 94B of over-channel tie assembly 96B can have a curvature generally congruent with a circumferential line about tie pivot 66 (refer FIG. 17) and the trailing edges 154B of sides 157B of boom arm 86B can have a curvature to be congruent in the travel position. This can allow engagement of sides 94B in hooks 161B for the travel configuration without fore/aft movement of pivot 66 or partial lifting of boom arm 86B.

Another difference is that the over-channel tie 216B includes a bend to provide clearance from sleeve 115B when the tie is generally vertical and engaged with catch 76B for the folded seat configuration. Locking device 98B differs from the first compound hinge embodiment 60 in that the locking device is attached to the upper flange surface of the left angular projection 80B and is a catch that can be one of many suitable embodiments commonly available. In the travel configuration locking device 98B covers the rear edge of over-channel 95B and prevents the over-channel from moving up and away from angular projections 80B. The particular locking device 98B shown is a spring latch having a spring loaded latch striker 232B that in the travel position covers the rear edge of over-channel 95B and can be retracted to allow the over-channel to lift freely.

The particular locking device embodiment 98B includes tubular a latch body 228B of rectangular tube open at the forward end and closed at the rear end. The latch body encloses from the rearward end a compression spring 231B then the latch striker 232B of cross-section having a sliding fit in the latch body. The latch striker 232B has on one side a knob or handle 234B that fits through and is limited in movement by elongate hole 230B in the side of tubular body 228B. The upper forward end of latch striker 232B includes a chamfer 233B. When over-channel 95B is pushed down into the travel position of FIG. 6B the rear edge of the over-channel pushes on the chamfer and causes the striker to be pushed back to the retracted position. When over-channel 95B reaches the travel position against angular projections 80B the striker springs back to the extended position over the rear edge of over-channel 95B locking it in the travel position. When collapsing tricycle 20 striker 232B of locking device 98B can be retracted by handle 234B to allow the over-channel to freely lift.

Thus the tapered gap between the chamfers 139B of sides 157B of boom arm 86B in co-operation with angular projections 80 comprise a clamping means on the spine to arrest the angular projections 80 in the travel position and release the angular projections to allow folding of the lateral arms 28 to their stowed position. Sides 157B of boom arm 86B provide the jaws of a manual clamp and the angular projections 80 move in and out of the jaws. The boom pivot 84B can be part of the compound hinge 60B and the clamping means can arrest the boom 44 in the travel position.

As can be appreciated, in a variation of this embodiment (not shown) without locking device 98B, the compound hinge can still arrest the lateral arms 28 in their travel position.

FIG. 20 shows another exemplary locking device that can be used in compound hinges. It shows a perspective partial view of a compound hinge with a cutout to reveal the inside of tie 216D and locking device 98D. The rear portion of the tie is not shown for clarity. Over-channel tie assembly 96D includes over-channel 95D and tie 216D. The tie 216D includes, through both sides, holes 203D (one shown) and through its underside a slot 204D having a wider rear end. Locking device 98D is of thin material having an upper part including a hole 205D. Locking device 98D extends down to support a forward facing hook 206D and rearwards to support a handle 207D. A pin 209D extends upwards from the handle.

Locking device 98D is inserted through slot 204D and pivotably supported from tie 216D by a fastener (not shown) through holes 203D and 205D. A compression spring 211D fits over pin 209D and together they are inserted through the rear of slot 204D. The spring presses against the under surface of the top of tie 216D and thus provides a resistance to handle 207D being lifted. A catch pin 124D extends up from the top surface of angular projection 80D and then extends horizontally transverse across the compound hinge. The catch pin could alternately be on the other angular projection. When over-channel 95D is pushed down onto the compound hinge to the operational position shown, the incline on lower forward edge of hook 206D contacts catch pin 124D and, until the hook is below the catch pin, pushes the hook back against the force of spring 211D. Next, hook 206D engages under the catch pin 124D. When folding the tricycle handle 207D can be lifted to disengage the hook from the catch pin, and the over-channel tie assembly 96D can then be pulled away from the compound hinge.

In some embodiments of the compound hinge, such as embodiment 60B, locking device 98D can substitute for the previously included locking device. In other embodiments of the compound hinge, locking device 98D can be used as an additional backup locking device.

Other Compound Hinge Embodiments

Yet another embodiment of the compound hinge 60D is shown in FIG. 21, comprising parts and assemblies previously described in compound hinge embodiment 60 with the following differences. As a substitute for locking device 98, compound hinge 60D includes an adjustable axle assembly 98E comprising a threaded axle 189 with a locknut 188 each end. The locknuts 188 can be adjusted to restrain over-channel sides 94 when the over-channel 95 is pushed downwards into its operational position. The adjustable axle could alternately be a rod with threaded holes in each end and wide head screws fitted in each hole (not shown). The compound hinge includes an over-channel tie 96E that includes locking device 98D (FIG. 20), and catch pin 124E attached to angular projection 80 similar to those in FIG. 20. These parts can operate the same way as described for FIG. 20 and can cooperate to prevent over-channel 95 from moving up in the travel configuration. The compound hinge could alternately include a locking device (not shown) similar to locking device 98B (FIG. 8B) in embodiment 60B. In embodiment 60D ramps 217 in cooperation with inner faces of nuts 188 comprise a clamping means on the spine to arrest the angular projections 80 in the travel position, and release the angular projections to allow folding of the lateral arms 28 to their stowed position.

As can be appreciated by those skilled in the art, various parts of the compound hinges described previously can be combined to form yet other compound hinges. As an example yet another embodiment of the compound hinge, 60E (not shown), can be similar to compound hinge embodiment 60 with the following differences. This embodiment can include over-channel retainer 175 (FIG. 8C), and an over-channel 95 that includes ramps 217 (FIG. 7). The embodiment can omit locking device 98 and can further include a locking device functionally similar to locking device 98B (FIG. 8B) in embodiment 60B, or locking device 98D of FIG. 20, to prevent over-channel 95 from moving up in the travel configuration. In this embodiment, ramps 217 in cooperation with restraining surfaces 176 and 177 of over-channel retainer 175 comprise a clamping means on the spine to arrest the angular projections 80 in the travel position, and release the angular projections to allow folding of the lateral arms 28 to their stowed position.

Various parts of all embodiments of compound hinge 60 can be formed with varying thickness (not shown) to minimise weight by methods, including molding or casting or pressing to shape, known to those skilled in the art.

Lateral Arm Folding

Compound hinge 60 can provide for both lateral arm folding and boom folding. Other parts can work in cooperation with the hinge to achieve tricycle folding and the description here will firstly cover those parts related to lateral arm folding.

FIG. 9 and FIG. 10 show the compound hinge 60 and linkage arrangement 38 in frame 22. FIG. 9 shows the travel configuration and FIG. 10 shows the lateral arms stowed.

Compound hinge 60 pivotably attaches lateral arms 28 to spine 26 and permits the lateral arms to be folded rearward each to their stowed position. Additionally frame 20 can also include additional stops (not shown) to restrain upward movement the distal ends of lateral arms 28 in the stowed arm configuration. Linkage arrangement 38 extends between the kingpins 30 and in the travel configuration maintains the front wheels 36 at a controlled near parallel orientation. It is highly desirable for ease of folding that no detachment of parts is required in linkage arrangement 38 when folding the lateral arms. The linkage arrangement includes two tie rods 392 connected to a radius arm 394 in a radius arm assembly 395 to allow the tie rods to fold back generally in unison with lateral arms 28 and avoid the detachment of any parts of the linkage.

Referring also to FIG. 11, radius arm 394 has a pivot end and an arc end, a pivot assembly 404 connects the pivot end to the spine 26, and the arc end pivotably connects the pair of tie rods 392 which control the steering of the front wheels 36, this arrangement thereby allowing the tie rods to fold with the lateral arms 28 to their stowed position. The arc end of the radius arm has spaced holes 400 with fasteners (not shown) joining the left and right tie rods 392. The pivot end of the radius arm includes a tongue 396 for alignment of the arm as described in detail later.

Referring again to FIG. 9 a steering arm 384 extends from each kingpin 30. The outer end of each tie rod 392 is coupled by fasteners (not shown) to the distal end of the steering arm of the associated kingpin. In the travel configuration the linkage arrangement 38 causes the two the kingpins and the radius arm 394 to rotate in general angular unison. Tie-rods 392 can be common tie rods, including at each end rod-ends 393 attached by a screw thread allowing tie-rod length adjustment. The rod-ends provide a pivotable connection at each end of the tie rod that allows for varying angles in the connection. Such tie rods are known to those skilled in the art.

Kingpins 30 are pivotably mounted for rotation in a cylindrical, generally vertical sleeve 372 attached to the distal end of each lateral arm 28. An axle 382 (shown in FIG. 10) extends generally horizontally outward from the upper end of the kingpin and has a steerable front wheel 36 rotatably mounted on it. Thus axles 382 are mountings for the front wheels. Steering arm 384 is attached to and extends rearward from the kingpin above the sleeve. The manufacture of kingpins that rotate in a sleeve is well known to those skilled in the art. The prior art is replete with examples of kingpins including some with suspension. Kingpins used on this tricycle should be able to rotate the axle forward approximately 90 degrees to accommodate lateral arm folding. The camber angle and caster angle of the kingpins, and the angle to the horizontal plane of the axle 382 and thereby the camber angle of front wheels 36, and the length and relative angle of steering arm 384 can be chosen by those skilled in the art to suit the desired steering properties of the particular tricycle design.

Radius Arm

To minimise wear of the front tyres (or tires) it is highly desirable that in the travel configuration (FIG. 14), with front wheels 36 aligned for straight forward travel, the front wheels can be adjusted to be parallel or pointing slightly inward (commonly known as toe-in). This can be achieved by adjusting the length of tie-rods 392. Also, to minimise the need to lift and carry tricycle 20 when folded (FIG. 15) it is highly desirable that front wheels 36 are parallel in the stowed arm configuration so that the tricycle may be rolled on its wheels. To allow both requirements to be satisfied the stowed arm configuration needs to accommodate a plurality of tie-rod lengths while keeping the front wheels 36 parallel. This is achieved by including adjustments in the radius arm assembly 395 as described below.

One embodiment of radius arm assembly 395 is shown in FIG. 11. The assembly includes radius arm 394 of plate construction supporting an arc end with spaced holes 400 and, at the other end, tongue 396 that can be downward inclined. Radius arm pivot 404 includes an axle 405 pivotably fitted in sleeve 406, that itself is fixed through spine 26 generally vertically and generally normal to the spine. The axle is secured in the sleeve by a fastener 410 with washer 409. Radius arm 394 is attached to the upper end of axle 405, thereby allowing rotation of the radius arm relative to the frame. The radius arm defines slot 402 along its length and a fastening means engages the slot to afford adjustment whereby the length of the radius arm from the pivot to the arc end can be adjusted. The fastening means comprises axle 405 having a stepped end 407 that engages the elongate slot 402 and is held by fastener 408. Tie rods 392 can be adjusted to length for the desired toe-in and radius arm 394 can thus be positioned using the slideable connection to orient the front wheels 36 parallel in the stowed arm configuration.

Another embodiment of radius arm assembly, 395A is shown in FIG. 11A. This embodiment differs in that it includes a plate 412A that has a lower side shaped to sit on spine 26. Also extending upward from the upper side of the plate is axle 405A with a stepped end 407A. Radius arm 394A includes hole 402A by which it is pivotably connected to stepped end 407A of the axle forming radius arm pivot 404A. Pivot 404A can include bushes or bearings (not shown) and a fastener (not shown) holds radius arm 394A on stepped end 407A of the axle. Plate 412A also includes an elongate slot 414A. One or two fasteners (not shown) are fixed through that slot into holes (not shown) in the top surface of spine 26 to fasten plate 412A to the spine and to provide a slideable connection for the plate. The fasteners are tightened to fix the slideable connection in the required position. Similar to embodiment 395, tie rods 392 can be adjusted to length for the desired toe-in and pivot 404A can be positioned using the slideable connection to orient the front wheels 36 parallel in the stowed arm configuration.

Yet another embodiment of the radius arm assembly, 395B can include radius arm 394B, which is shown in FIG. 11B. The radius arm assembly can be attached using hole 402B to the axle 405 (FIG. 11) of the first embodiment. The radius arm differs in that a slot 397B divides the arm from the arc end into two narrower arms 394L and 394R each having at the arc end a hole 400B. Arms 394L and 394R have threaded holes (not shown) through the side accepting fasteners 398B. When the fasteners are tightened the ends of the fasteners can press together pushing apart the arc ends of arms 394L and 394R thereby expanding the width of slot 397B and increasing the spacing between holes 400B.

Also, a fastener 399B is fitted through another hole (not shown) through the side of arm 394L and into a threaded hole (not shown) through the side of arm 394R. When the fastener is tightened it pulls together arms 394L and 394R reducing the width of slot 397B and decreasing the spacing between holes 400B. As can be appreciated fasteners 398B and 399B can be used in co-operation to adjust the spacing between holes 400B. Thus with this embodiment tie rods 392 can be adjusted to length to orient the front wheels 36 parallel in the stowed arm configuration and then with the tricycle in the travel configuration the spacing of holes 400B can be adjusted for the desired toe-in of the front wheels. Since arms 394L and 394R extend directly towards the arc end of the radius arm this embodiment is significantly less bulky around the pivot area than the prior art of Non-Patent Document 2, a major advantage in this crowded area of the tricycle.

Yet another embodiment of the radius arm assembly, 395C is shown in FIG. 11C. The radius arm assembly can be attached using hole 402C to the axle 405 (FIG. 11) of the first embodiment. The radius arm assembly differs from the first embodiment in that hole 402C is not slotted and the arm of the assembly comprises two slideably connected parts. Inner radius arm 394C supports a outer radius arm 411C. Fasteners (not shown) engage through slot 403C in the outer arm and into holes 401C on the inner arm 394C, providing a slideable adjustment. Thus the radius arm defines the slot 402C along its length and a fastening means engages the slot to afford adjustment whereby the length of the radius arm from the pivot to the arc end can be adjusted.

As mentioned previously the tricycle can use other steering means known as under-seat steering or push-pull steering or joystick steering systems. In prior art they often include various means that are suitable to fold the handlebars. These steering means are common in recumbent tricycles and well known to those in the art and will not be detailed herein apart from an exemplary means of connection to linkage arrangement 38. Joystick steering (not shown) can be attached directly to the top of the radius arm assembly, including by any fastener that connects the radius arm 394C to axle 405. Under-seat steering or push-pull steering (not shown) can be connected by a link to the radius arm.

As shown in FIG. 11C a lateral arm 389 can extend from the side of radius arm inner arm 394C to provide an attachment point for a steering link 391 to the handlebars of under-seat steering (not shown) or the steering lever of push-pull steering (not shown). In this embodiment the distal end of lateral arm 389 is offset down to provide added clearance for tie-rods 392 when stowed (FIG. 10), and includes a hole 390 as the steering link attachment point. Steering link 391 is a common tie-rod and is attached by a fastener (not shown) through hole 390. The link can also include a quick disconnect means (not shown), such as a quick-disconnect fastener at either end of the steering link 391 to allow free movement of the handlebars to facilitate folding the tricycle.

In summary, in embodiments of radius arm assembly 395, 395A and 395C, the length of the tie rods 392 can be adjusted to orient the front wheels 36 parallel in the travel position and then the radius arm assembly (395 or 395A) can be slideably adjusted for the front wheels to be parallel in the stowed arm configuration. In embodiment 395B tie rods 392 can be adjusted to length to orient the front wheels 36 parallel in the stowed arm configuration and the spacing of holes 400B can be adjusted for said wheels to be parallel in the travel configuration.

Thus each embodiment of the radius arm described above includes an adjustment that can be set in a predetermined position and thereafter front wheels 36 that are parallel when the lateral arms 28 lie in their travel position will also be parallel when the lateral arms are folded to their stowed position, thereby allowing the tricycle to be rolled true when the lateral arms are in their stowed position.

Returning to FIG. 10 and also FIG. 8, when moving to the stowed arm configuration, stops 142 on angular projections 80 rotate to engage and automatically center and restrain tongue 396 and thereby the radius arm assembly 395. Rotation of kingpins 30 is stopped through linkage arrangement 38 thereby holding front wheels 36 parallel to spine 26.

Thus the angular projections 80 include stops 142 that arrest the radius arm 395 parallel to the spine 26 when the lateral arms 28 are in the stowed position, thereby aligning the front wheels 36 parallel to the spine 26 and preventing unwanted steering when the lateral arms 28 are in the stowed position and the tricycle is rolled.

Lateral Arm Catch

Tricycle 20 also includes a catch 416 that can arrest the lateral arms 28 in their stowed position and selectively release the lateral arms when returning the tricycle to the travel configuration. Referring also to FIG. 12, one embodiment of catch 416 is made of a flat spring material supporting hooks 417 at each end. The catch is attached through holes 419 on the catch by fasteners (not shown) to threaded holes (not shown) in the underside of spine 26. A pin 370 is fixed on the underside of each lateral arm 28. When the lateral arms are moving to their stowed position, pins 370 slide over the hooks 417 on the catch. Each pin 370 can have a bevel 371 oriented to facilitate the easy sliding of the pin over the hook when moving the lateral arms 28 to their stowed position. However, once past pins 370, the hooks 417 rise behind the trailing side of the pins thereby holding lateral arms 28 in their stowed position.

Attached to the upper side of catch 416 by fasteners (not shown) through holes 421 can be a rigid handle 418. Spine 26 is enclosed by the handle. The upper surface 420 of the handle provides a convenient means to push down catch 416 to disengage hooks 417 from pins 370 and allow the lateral arms 28 to move to the travel position. The handle can be omitted and catch 416 disengaged from lateral arms 28 by pushing down on hooks 417.

Another embodiment of catch 416 is shown in FIG. 12A. Catch 416A differs in that it includes at each distal end a hole 422A to engage pin 370 and an inclined ramp 423A to facilitate the easy sliding of the pin over the catch when moving the lateral arms to their stowed position. Catch 416 can be disengaged from lateral arms 28 by pushing down on ramps 423A to allow the lateral arms 28 to move to the travel position. Each distal end of catch 416 can curve forward (not shown) congruent with the movement arc of pin 370 when the lateral arms 28 are moved.

Thus, in each of the aforementioned lateral arm catch embodiments, catch 416 in cooperation with pins 370 comprise a retaining means to arrest the lateral arms 28 in their stowed position and release the lateral arms to allow them to return to their travel position.

Yet another embodiment of catch 416 is shown in FIG. 12B. Each kingpin steering arm 384 supports a threaded tube 385 at its distal end and a fastener 386 couples rod end 393 to that threaded tube 385. Catch 416B differs from the first embodiment in that it is made from spring wire and it engages with fastener 386 arresting it in a locked position. Fastener 386 can be a partially threaded rod with a nut 387 to hold rod end 393 to tube 385. Catch 416B includes a central "U"-bend 428B forming a slideable connection with fasteners (not shown) engaged in holes 250 on spine 26. The catch can be slideably adjusted longitudinally on the spine and locked in the desired position by the fasteners. The fasteners can include washers (not shown) with turndowns on opposing sides to retain the wire sides of "U"-bend 428B.

Extending from ends of the "U"-bend each side of catch 416B includes first a coil 430B followed by an unequal "U"-bend 432B and then a tail 434B that forms a ramp for guiding fastener 386. The unequal "U"-bend 432B has a longer leg on the proximal side so that when the lateral arm 28 is moving to their stowed position fastener 386 pushes back tail 434B, then hits the proximal side of the bend and the bend springs forward to enclose the fastener. Referring to FIG. 10, positional locking of radius arm 394 by stops 142 as described above, also ensures positional locking of the proximal ends of tie rods 392. Thus the tie-rods are restrained to an arc around their proximal ends. Arresting fastener 386 in a locked position thereby ensures rotational locking of kingpins 30, thus keeping the front wheels 36 parallel. The tail 434B can be easily pulled back to allow the lateral arm 28 to move to the travel configuration.

Thus, in this embodiment, catch 416B in cooperation with fastener 386 comprise a retaining means to arrest the lateral arms 28 in their stowed position and release the lateral arms to allow the lateral arms to return to the travel position. FIG. 12 also shows an optional guard bar 540 attached at its middle portion to the top of spine 26 by fasteners (not shown). The ends of the guard bar overlap and provide additional support to the lateral arms 28 in their stowed position if a heavy load is put on the frame 22 whilst in the stowed arm configuration.

Cord

Referring to FIG. 9, tricycle 20 can also include a cord assembly 546 to allow easier and faster folding of the lateral arms 28. The cord assembly 546 is Y shaped having a frame end and two arm ends, each arm end being attached to one of the lateral arms 28 and the frame end is attached to the spine 26 adjacent the rear wheel, whereby upward tension on the cord assembly 546 intermediate the ends folds each lateral arms to its stowed position.

Referring to FIG. 12, a pin 368 with a mushroom shaped head 369 is attached to the underside of each lateral arm 28. The cord assembly 546 can include a cord 547 that has a loop 548 at each arm end that tightly fits over the head 369 of pin 368. FIG. 13 shows a view of the right side of tricycle 20 with right lateral arm 28 and attachments not shown for clarity. Referring to FIG. 13, frame 22 supports a seat tube 56 extending upward from the frame. Referring again to FIG. 9, the seat tube can include a threaded hole (not shown) to accept a threaded eyebolt 554. Cord 547 can be threaded through a hose 550 and through the eye of the eyebolt 554 and back through the hose 550. In this embodiment, tensioning adjustment for cord 547 is provided by screwing eyebolt 554 into the frame 22. Loops 548 can be removed from pin 368 while turning the eyebolt.

This tensioning adjustment can alternately be provided by a slideable bracket (not shown) on spine 26 or by another form of adjustable mount (not shown) on the frame. Cord assembly 546 can also include a stretch device (not shown) attached at the front end of hose 550 and threaded through the hose and attached to eyebolt 554. The stretch device causes the hose to normally spring back to eyebolt 554, but allows the hose to be pulled forward when folding to achieve a better fulcrum position. The stretch device can be a piece of elastic cord. The assembly allows both lateral arms 28 to be folded concurrently in a simple motion of lifting hose 550 while pulling the hose forward.

Another embodiment (not shown) of cord assembly 546 can be to thread the mid-portion of cord 547 through eyebolt 554 to a handle. Both lateral arms 28 can be folded concurrently in a simple motion of pulling up the handle.

Yet another embodiment (not shown) of cord assembly 546 can be to link the rear portion of cord 547 by a cable to the folding action of seat 42 so that when the seat is raised in the direction of arrow 602 (FIG. 13), cord 547 is pulled and the lateral arms 28 fold.

Boom Crank Assembly

FIG. 15 shows the pedal crank assembly 46 on boom 44. Boom 44 can include a conventional adjustable telescopic boom arrangement for adjustment of the frame 22 for riders of differing leg length. The boom can include an outer tube 284 at its proximal end and, at its distal end, an inner tube 286 fitted slideably inside the outer tube. The distal end of outer tube 284 includes a longitudinal slot (not shown) on the underside bridged by conventional tube clamps 45 (FIG. 13) that can be tightened to prevent axial and rotational movement of the pedal crank assembly. The inner tube 286 supports a crank hub 292 that supports pedal crank assembly 46. Thus crank hub 292 is also a mount for pedal crank assembly 46.

As described previously pedal crank assembly 46 accommodates a conventional crank-type pedal arrangement with an attached drive sprocket set 48. The drive sprocket set 48 can include one or more drive sprockets 298. In embodiments with multiple drive sprockets 298, a derailleur post 300 extends from crank hub 292 and the distal end supports a conventional "braze-on" derailleur mounting bracket 301 and a conventional "braze-on" front derailleur 51 to allow gear changing between the sprockets. Using small diameter tube for post 300 and locating it close to close to drive sprockets 298 creates clearance space on the left side 293 of crank hub 292 for spine 26 when the boom is folded as described in detail later.

Drive sprockets 298 can be selected from the many types used on standard bicycles. Pedal crank assembly 46 can be an internally geared type (not shown) such the Schlumpf Speed Drive wherein the sprocket 298 can rotate at a different rate to the pedals depending on the internal gear currently selected. This can provide multiple gears at the pedal crank assembly 46 without the need for a front derailleur 51, thereby allowing more clear space for folding.

Boom Folding

FIG. 13 shows a view of the right side of tricycle 20 in the travel configuration with parts including the right front wheel 28 not shown for clarity. FIG. 16 shows a view of the right side of tricycle 20 in the Compact Fold Configuration also with parts including the right front wheel 28 not shown for clarity. Other parts work in cooperation with boom pivot 84 to achieve boom folding and the description here will now include those parts. As described previously the drive system includes drive chain 50 that connects and transfers power from drive sprocket set 48 to the rear wheel sprocket set 52. The drive chain 50 is schematically represented by dashed lines. With the lateral arms 28 in their stowed position as shown in FIG. 10 and the seat 42 raised as shown by arrow 602 in FIG. 13, boom 44 can be freely rotated in the direction shown by arrow 608 from the travel position shown in FIG. 13 to the folded position shown in FIG. 16.

As described previously, the rotational axis of boom pivot 84 (FIG. 7) can have a small angular offset in the horizontal plane to cause the boom 44 to move to the right side of frame 22 as it folds back, providing greater clearance between the frame and drive sprocket set 48. The rotational axis of boom pivot 84 can also have a small angular offset in the vertical plane, high on the right side to cause the boom 44 and thereby pedal crank assembly 46 and drive sprocket set 48 to rotate as the boom is folded back so the then lower portion of the pedal crank assembly moves to the right side of frame 22 as the boom folds back, again providing greater clearance between the frame and drive sprocket set 48. The angular offsets are useful when pedal crank assembly 46 includes a front derailleur 51.

Referring to FIG. 13 and FIG. 16, compound hinge 60 can be inclined to have its forward end above its rear end thereby increasing the vertical clearance between the rear end 62 (FIG. 6) of the compound hinge and boom 44 when the boom is in its stowed position, there by allowing more vertical clearance for radius arm assembly 395.

FIG. 13 and FIG. 14 show parts of the drive system 49 in the travel configuration. A pulley 480 is rotatably attached to spine 26 by a fastener (not shown) through hole 479 and a mating hole (not shown) on the spine. Drive chain 50 (represented by dashed lines) links from the top of drive sprocket set 48 through a chain sleeve 499 and around the underside of pulley 480 to the top of rear wheel sprocket set 52. That portion of the drive system transfers the rider's pedalling force to rotate the rear wheel sprocket set and thereby the rear wheel 34 and can be called the tension portion of the drive system. The chain continues around the sprocket, then through a rear derailleur 53, through a chain sleeve 490, through another chain sleeve 482 to the bottom of drive sprocket set 48 and around the sprocket to its top completing the drive chain loop. That portion of the drive system can be called the return portion.

Chain sleeves contain the chain and help protect the user from a greasy chain and are a common component on recumbent bicycles and tricycles and are usually made of a semi-rigid plastic tube. Pulleys are also a common drive system component on recumbent bicycles and tricycles to provide a robust direction change in the chain path to avoid other parts.

Pulley 480 diverts the chain path under seat 42 and is shown as a grooved pulley but such pulleys are of many types including open toothed wheels and grooved pulleys and any type can be used with tricycle 20.

Chain sleeve 490 is located within and is supported by a sleeve 493 on an angle bracket 494. The generally vertical portion of the angle bracket extends up and is also supported by the previously mentioned fastener (not shown) through pulley 480. The generally horizontal portion of the angle bracket forms a barrier to prevent drive chain 50 moving down and off the pulley.

Chain sleeves 482 and 499 are pivotably supported to allow them to work in cooperation with folding of the boom 44. Sleeve 482 is located within and is supported by a sleeve 484 on a bracket 485. The bracket is pivotably supported by a fastener 487 through holes 486, together forming a return chain sleeve pivot assembly 55. The fastener connects to a sleeve 280 fixed on the lower side of the proximal end of boom 44. Bracket 485 and thereby sleeve 482 can freely slide on fastener 487 to accommodate varying chain paths when multiple drive sprockets 298 are used and the chain can at different times align with any one of the drive sprockets.

Chain sleeve 499 is located within and is supported by a sleeve 501 on a bracket 502. The bracket is pivotably supported by a fastener 504 through an elongate hole 503, together forming a tension chain sleeve pivot assembly 54. The fastener connects to a hole (not shown) in the upper end of a curved bracket 510 that itself is attached to spine 26 by fasteners (not shown) through spaced holes 512 (one shown). The curve in bracket 510 allows additional clearance space for rotation of radius arm assembly 395. Chain sleeve 499 is located within the tension portion of drive system 49 and drive chain 50 can be in high tension when the tricycle 20 is being pedalled. To avoid added friction and wear some flexibility is required in the location and alignment of chain sleeve 499 so it is free to align with drive chain 50. Bracket 502 and thereby sleeve chain 499 can freely slide on fastener 504 and via elongate hole 503 can rise or lower to accommodate varying chain paths when multiple drive sprockets 298 are used and the chain can at different times align with any drive sprocket.

As would be appreciated by those in the art drive system 49 can optionally include extra pulleys (not shown) or chain tensioning devices (not shown). Also, as known to those in the art, chain sleeves can optionally comprise two sections of semi-rigid sleeve joined by a short section of more flexible sleeve (not shown). These can provide a defined bending point to fold the chain sleeves when the tricycle is collapsed.

As noted previously, boom 44 can be rotated from the travel position shown in FIG. 13 in the direction shown by arrow 608 to the folded position shown in FIG. 16. Referring to FIG. 16, boom 44, chain sleeve 482 and chain sleeve 499 have all been rotated, each around its respective pivot, from the travel position shown in FIG. 13 to the boom folded position shown in FIG. 16. The forward end 491 of chain sleeve 490 extends to a point just forward of lateral arm pivots 78 thereby placing the end 491 just forward of angular projections 80 in their stowed arm configuration. Drive chain 50 is generally vertical between forward end 491 of chain sleeve 490 and end 483 of chain sleeve 482 that is above boom 44 and sleeve pivot 55. Also, drive chain 50 has an acute change of direction around tension chain sleeve pivot 54 between pulley 480 and chain sleeve rear end 500. The conventional chain tensioning function of rear derailleur 53 compensates for small changes in the drive chain path through this portion due to the folding action of the drive system. A conventional chain tensioner (not shown) as used on some bicycles can be substituted in embodiments not using a rear derailleur.

Seat Assembly

Referring to FIG. 1, as described previously seat 42 includes a seat base portion 41 for the rider to sit upon and a seat back portion 43 for the rider to rest their back. Recumbent bicycle or tricycle seats are available in many types and no particular type is required for tricycle 20. These seats use standard fabrication techniques known to those skilled in the art and many are available off-the-shelf. They can have various shapes including various lengths and widths, various contoured longitudinal profiles and widths, ventilation holes and may have various attachments including padding, head rests, neck rests, movable side-supports (or wings), integral slideable adjustment of seat length, and a hinge between seat base 41 and the seat back 43. Almost any form of recumbent bicycle or tricycle seat may be used with tricycle 20 provided it has or can be fitted with mounting locations at the lower front 446, the lower base 444 and the back rear 448.

One common form of recumbent bicycle or tricycle seat is known as hardshell and one common form of hardshell seat 42 is shown in FIG. 16 and FIG. 17 having a contoured upper surface 438 and two reinforcing ribs 450. These seats are commonly made from composite plastics including fibreglass and carbon fibre or from thin sheet metaL Another common form of hardshell seat (not shown) has a stronger upper surface requiring no reinforcing ribs. Seat 42 uses standard fabrication techniques known to those skilled in the art.

Another very common form of recumbent bicycle or tricycle seat is known as mesh and has a tubular frame with a fabric (usually breathable) stretched across the upper side. The tubular frame can be metal or carbon fibre. FIG. 18A shows a seat assembly 42A using one form of a mesh seat.

Returning to FIG. 16 and FIG. 17 seat 42 includes at its rear end integral sleeves 466 embedded through reinforcing ribs 450. A seat arm assembly 57 is attached to sleeves 466 by a rear seat pivot assembly 67 comprising a fastener or shaft (not shown) through the sleeves 466 and a sleeve 560. Extending from sleeve 560 are two adjustable length arms 562. Such arms are known to those skilled in the art and various means including clamps or pins in holes can be used to make them of adjustable length and any of the various means can be used in tricycle 20. One particular embodiment of the arms 562 is shown in FIG. 17 and includes at the proximal end of the arms a tube 564 with spaced holes 566 slideably fitted at its distal end into an outer tube 568 with one hole 570, the outer tube supporting a plate 572 also having a hole 574. The length of the arms can be easily adjusted by sliding the outer tube over the inner tube and inserting a fastener (not shown), usually a ball pin, through hole 570 and through one of spaced holes 566.

Those skilled in the art will appreciate that integral sleeves 466 could alternately be replaced by a channel shaped bracket (not shown) fixed to the seat and providing holes for fastener or shaft of rear seat pivot assembly 67.

Seat 42 also includes a weight bearing bracket 454 fixed on the underside 444 of seat base 41 by fasteners (not shown) through spaced holes 456. The bracket in this embodiment is channel-shaped and includes slots 458 in the channel sides. Referring also to FIG. 9, spine 26 supports a bracket support 242 that is fixed through the spine. Thus bracket support 242 is a mounting on the spine to support a seat. In the travel configuration, slots 458 engage on bracket support 242 thereby forming a major weight carrying support for the seat. In this embodiment the support 242 is a shaft and can have circumferential grooves 243 to receive the slots of bracket 454 thereby providing extra lateral support to the bracket. In the travel position the upper edge of slots 458 can have inclination downwards towards the open end of the slots so that in the event of any free movement the weight of the user on the seat tends to engage support 242 further into slots 458 increasing the security of seat mounting. Slots 458 have longer upper edges 459 for easier alignment and guiding of support 242 into the slots when moving seat 42 to the travel position. As can be appreciated by those skilled in the art, seat 42 can include multiple sets of mounting points and mounting brackets (not shown) for adjustment of the seat position.

Another embodiment (not shown) can alternately include a shaft in a weight bearing bracket attached to seat 42 and a bracket support on spine 26, that bracket having slots open at the front to receive the shaft in the travel position. The lower edge those slots can be inclined upwards towards the forward or open end so that rider weight tends to engage the shaft further into the slots. Thus both embodiments provide a weight bearing bracket projecting from the base portion 41 of the seat 42, which engages with a bracket support on the spine 26. In both embodiments the shaft engages further into the slots when the seat is pushed down by rider weight, or pushed back by the rider pushing on the pedals.

Seat 42 also includes a channel shaped bracket 460 fixed to seat underside front 446 by fasteners (not shown) through spaced holes 462. The bracket includes in the channel sides holes 464 which are pivotably connected to sleeve 222 of over-channel tie 216 by a fastener (not shown) thereby forming over-channel tie pivot assembly 66.

Referring also to FIG. 1 and to FIG. 13, spine 26 includes at its rear end a transverse sleeve 27. Seat tube 56 extends upward from transverse sleeve 27 and can be curved generally congruent with a circumferential arc of rear wheel 34 to keep it compact with the rear wheel. FIG. 18 is an exploded view and shows for clarity only parts attached to pivot 67 on the upper portion of seat tube 56. At the upper end of tube 56 is attached a sleeve 260 and therethrough is located a hollow axle 262. The hollow axle can be a standard bicycle quick-release axle and fitted therethrough can be a standard bicycle quick-release axle skewer 264. Beginning from each end, hollow axle 262 passes through a slot 348 (connection shown dotted) on seat stay 33, an outer nut 268, a hole 574 on one arm of seat arm 57 (connection shown dotted) to create a seat tube pivot assembly 69, an inner nut 266, and then sleeve 260.

Each nut can have a washer as shown. Inner nuts 266 can be tightened to lock axle 262 from rotating in sleeve 260. Outer nuts 268 can be tightened relative to the inner nuts 266 to control the friction on the rotation of seat arm 57 and isolate the rotation from the effects of locking or releasing quick-release axle skewer 264. Thereby seat arm 57 can be rotated on pivot 69 without releasing quick-release axle skewer 264. Thus seat tube 56 supports the sleeve 260 and thereby seat tube pivot assembly 69, which supports seat arm 57, which through its connection to the seat 42 described previously, supports the seat. Thus pivot 69 is a mounting on the spine to support a seat. As can be appreciated by those in the art, in other embodiments (not shown) seat arm 57 and seat stay 33 can be connected to seat tube 56 by independent means.

Another exemplary embodiment of a seat arm assembly, 57B is shown in FIG. 18B comprising a sleeve 560B with two slotted arms 562B extending from the sleeve, each arm including a slot 574B. As can be appreciated by those skilled in the art this arm assembly can be substituted for arm assembly 57 in FIG. 18, with sleeve 560B substituting for sleeve 560 and slots 574B engaging on hollow axle 262. Outer nut 268 can be replaced by a washer (not shown) thereby allowing quick-release axle skewer 264 to also lock the position of slotted arms 562B on hollow axle 262.

Seat Folding

Referring to FIG. 1 and FIG. 13, seat 42 can be put into the travel position by rotating the seat on pivots 67 and 69 and resting the edges 459 of bracket 454 on support 242, then pushing the seat back thereby engaging slots 458 into circumferential grooves 243 on support 242 (FIG. 9). The seat is then arrested in the travel position by rotating over-channel tie assembly 96 until over-channel 95 engages with compound hinge 60 and can be secured by locking device 98. Thus the clamping means can arrest and release the seat 42.

In brief, seat 42 has base portion 41, and rear portion 43 with seat pivot 67, weight bearing bracket 454 projecting from the base portion 41 engages with bracket support 242 on the spine 26, and tie 96 extending from the seat base portion 41 to the clamping means can arrest the seat 42 during tricycle travel, and release the seat to raise to allow the lateral arms 28 and attached front wheels 36 to move to their stowed position.

Also, seat pivot 67 allows the seat base 41 to raise and allow the boom 44 and lateral arms 28 to fold from their travel position to their stowed position and return to their travel position without removing the seat 42 from the tricycle.

Additionally seat 42 can be moved from the travel position shown in FIG. 1 to the folded seat configuration shown in FIG. 16 as follows. With locking device 98 released, over-channel tie assembly 96 can be lifted, rotating on pivot 66, to above compound hinge 60. The tie can then be moved forward with seat 42, rotating on pivots 67 and 69, until slots 458 on seat bracket 454 release from support 242.

Then the tie 96 and thereby seat 42 can be lifted freely, rotating on pivots 67 and 69, in the direction shown by arrow 602 (FIG. 13). After the lateral arms 28 and boom 44 are stowed as described previously, the tie and thereby seat 42 can be lowered, rotating on pivots 67 and 69 to the folded seat configuration shown in FIG. 16. Then tie 96 can be folded down, rotating on pivot 66 in the direction shown by arrow 610 (FIG. 16) to the folded over-channel position shown in FIG. 16. In this position over-channel tie assembly 96 can optionally be pushed down over catch 76 (FIG. 7), capturing pin 224 under the lip 75 of the catch, and securing the front of the seat. In this configuration the seat 42 is located between the front wheels 36 and handlebars 40, and seat base 41 is positioned above the front edge of the front wheels allowing a wider seat base 41.

Thus the detent on tie 96 engages catch 76 adjacent the clamping means, arresting the tie and supporting the base portion 41 of the seat 42 spaced above the spine frame 22 to clear the fully stowed front wheels 36, and allowing the tie to be detached and the seat raise to allow return of the front wheels to the travel position.

The tricycle can include a detent and catch combination, one of which is included in the seat and the other included in the spine, and which engage together and arrest the seat spaced above the spine to clear the fully stowed front wheels, and allow the seat to be detached and raise to allow return of the front wheels to the travel position. FIG. 16 shows an exemplary embodiment wherein tubular support bracket 437 is attached to handlebars 40 and extends up to support seat 42 in the stowed position. The upper end of the support bracket and the contact portion of the seat can include a standard detent catch combination (not shown), such as types commonly used to retain small doors closed, to arrest the seat and allow the seat to be detached and the seat to raise.

Rear End

Referring to FIG. 18 seat stay 33 includes at it its upper end spaced plates 346, each with a slot 348. From each plate extends a tube 344 to a second plate 350 that includes a hole 352. Holes 352 form part of a seat stay pivot assembly 68, further described below. In other embodiments (not shown) plate 350 can also be a standard clevis fork. A cross-brace 354 can link the upper portions of tubes 344 to ensure the tubes move in unison when rotated about holes 352. Alternate embodiments of the seat stay (not shown) can be used that include features common with seat stays used on bicycles. For example, the cross-brace can be omitted or the cross-brace can be made from tube or thin plate. Slots 348 can engage (connection shown dotted) on to the end portions of axle 262. The quick-release axle skewer 264 can thereby lock seat stay 33 to the axle and release it to allow the seat stay to be removed from the axle.

Referring to FIG. 1 and FIG. 13, spine frame 22 can include one or more chainstays 58, each chainstay having a proximal end and a distal end with the proximal end pivotably attached to the rear end of the spine 26 and the rear wheel 34 attached to the distal end, thereby allowing the chainstays 58 to fold forward and adjacent the spine 26, and allowing the tricycle to be collapsed to a shorter length. Transverse sleeve 27 on the rear of the spine 26 can form part of a chainstay pivot assembly 70. That pivot assembly can be a standard pivot used on bicycles for suspension or on folding bicycles for folding frame parts, both of which have many forms known to those in the art. In the embodiment of FIG. 1 and FIG. 13, chainstay pivot assembly 70 comprises pivot pin 35 pivotably attached through transverse sleeve 27 and at each end supporting a chainstay sleeve 31 ensuring the chainstay sleeves rotate in unison in chainstay pivot 70.

Extending back from each chainstay sleeve 31 as part of chainstay 58 is an arm 318 supporting a slotted plate or dropout 59. Referring temporarily to FIG. 16, rear wheel 34 includes a rear axle 29 that engages in the slots in dropout 59. Thus the dropouts 59 are supporting mountings for the rear wheel. The dropouts are a standard bicycle dropout and including a hole 332 (see FIG. 18A) that forms part of pivot 68. In alternative embodiments (not shown) holes 332 can be located at other locations along the chainstays for slightly altered folding geometry. Fasteners (not shown) pivotably connect holes 352 in seat stay 33 to holes 332 on chainstays 58 completing pivot 68. The dropout on the drive side can include a standard rear derailleur mounting extension 331.

Referring to FIG. 18 and FIG. 13, when seat stay 33 is locked into axle 262 by quick-release axle skewer 264, a rigid triangle is formed by the seat stays, chainstays 58, and seat tube 56. When seat stay 33 is released from axle 262 by releasing quick-release axle skewer 264, chainstays 58 can be rotated around pivot 70 and seat stay 33 can be rotated around pivot 68.

An angled chainstay pivot embodiment 70A is shown in FIG. 19, 19B and 19C, wherein the frame includes chainstays 58L and 58R, each chainstay having a proximal end and a distal end, with the proximal end pivotably attached to the rear end of the spine 26B and the rear wheel 34 attached to the distal end. Pivot 70A is oriented to allow the chainstays 58L and 58R to fold forward and the rear wheel 34 to tilt from a vertical position to a stowed position lying transversely across the tricycle adjacent the front wheels 36 and under the spine. As can be appreciated by those skilled in the art, other embodiments (not shown) can use a single chainstay to support the rear wheel from one side.

Embodiment 70A differs from the first mentioned chainstay pivot embodiment in the following ways. Pivot assembly 70A similarly comprises pivot pin 35A pivotably attached through transverse sleeve 27B, but at each end the pivot pin supports channel member 31A by holes 259 in its flange ends. Pivot pin 35A has an axis 244 (FIG. 19) that is also the chainstay pivot axis. The upper side of channel member 31A extends upwards to become angle section 258. This part can be constructed by fusing the two portions. Chainstays 58L and 58R extend back from channel member 31A and angle section 258 to support the rear wheel 34 (partially shown).

FIG. 19A shows a diagrammatic representation of the position and orientation of the chainstay pivot axis. The axis 244 has a centrepoint 'e' located midway between the two ends of the pivot pin. The axis 244 is defined within a vertical plane 'v' which is set at a predetermined angle 'a' to the tricycle central axis 24 that itself runs through the centre of the forward straight portion of spine 26B (FIG. 19). Centrepoint 'e' is offset a predetermined distance 'b' below, and a predetermined distance 'c' to the left side the intersection of central axis 24 with plane 'v'. Also within plane 'v' pivot pin axis 244 is inclined at a predetermined angle 'd' to the horizontal.

Viewed from the rear of the tricycle, when the chainstays 58L and 58R are folded forward under the spine 26B, angles 'a' and 'd' cause the rear wheel 34 to tilt anti-clockwise from a vertical position to a stowed position lying transversely across the tricycle adjacent the front wheels 36. Referring also to FIG. 4A (described more fully later), the offsets 'b' and 'c' provide clearance from spine 26B for the chainstays 58L and 58R when folded under the spine 26B (see the small gap between chainstay 58R and spine 26B).

Referring again to FIG. 19, in this embodiment seat tube 56A extends below the spine 26B to support transverse sleeve 27A and the rear portion of spine 26B attaches to it. Extending from the rear of seat tube 56A is a pad or chainstay stop 257 that restrains forward movement of the upper portion of angle section 258 in the travel position of chainstay pivot 70A. The rear surface of pad 257 can include an elastic material such as an elastomer to provide some cushioning. In other embodiments (not shown) the left chainstay could connect to the lower portion of channel member 31A sleeve, or include a brace to same, allowing the angle section 258 to be thinner.

The chainstay pivot arrangement can also include a catch arrangement to selectively retain chainstays in the travel position. The catch can take many forms known to those in the art. FIG. 19 shows one exemplary embodiment of the chainstay catch assembly 252 comprising a spring clip 253 having a slot 255 that captures a pin 256 in the travel position. The pin 256 is attached to the side of angular extension 258, and the spring clip 253 is attached to seat tube 56A by a fastener (not shown) through hole 254.

As can be appreciated by those skilled in the art, other tricycle embodiments (not shown) can include a chainstay pivot arrangement, a chainstay stop and a chainstay catch, and can omit the seat stays 33, pivot 68 and quick-release axle skewer 264 (see FIG. 18); since the chainstays in association with the chainstay stop can be sized to support the rear wheel without the omitted parts.

FIG. 3A and FIG. 4A show additional views of the angled chainstay pivot embodiment. FIG. 3A shows a side elevation from the right of the tricycle including the angled chainstay pivot embodiment in a short fold configuration, the tricycle free-standing on its front end. It shows an embodiment where the predetermined angles of the chainstay pivot axis have been set for the sides of the rear wheel 34 to contact the underside of both front wheels 36 in the short fold configuration. In this embodiment angles 'a' and 'd' are approximately 70 degrees and 40 degrees respectively but will vary with wheel size and other factors. FIG. 4A shows a perspective view of the tricycle including the angled chainstay pivot embodiment of FIG. 3A in the subcompact fold configuration without the rear wheel.

The design of chainstay pivot ensures that the weight of the rider on the seat naturally forces the chainstays into their travel position, regardless of the state of any associated locking means. This is a major advantage over the prior art that has a hinge in the spine like the ICE Vortex and Greenspeed GT3 wherein the weight of the rider applies a force to open the hinge if the hinge locking devices should ever release while being ridden.

Referring to FIG. 1 and FIG. 13, spine 26 can include an adjustable length arrangement with a means to arrest and release the adjustment. In one embodiment the rear portion of spine 26 is an inner tube 239 fitted slideably inside a forward portion outer tube 238. The rear end of outer tube 238 can include a longitudinal slot (not shown) bridged by a pair of conventional tube clamps 240 to tighten to prevent axial and rotational movement of the two ends of the spine. Unclamping clamps 240 and shortening adjustable length seat arm 57 allows the length of sub-compact folded tricycle to be further shortened for small spaces such as some conventional suitcases.

Tricycle Folding

As described hereafter tricycle 20 includes means for the tricycle to be quickly reduced to a plurality of collapsed configurations having various levels of compactness as follows. FIG. 2 shows a first collapsed configuration or compact fold configuration where no parts are removed. FIG. 3 shows second collapsed configuration or short fold configuration where no parts are removed. FIG. 4 shows a third collapsed configuration or sub-compact fold configuration where only the rear wheel is removed. FIG. 5 shows a fourth collapsed configuration or suitcase fold configuration where only the rear wheel is removed. FIG. 3A shows the short fold configuration for the angled chainstay pivot embodiment where no parts are removed, the tricycle free-standing on its front end. FIG. 4A shows the sub-compact fold configuration for the angled chainstay pivot embodiment.

Collapsed configurations are not limited to those listed above and as may be appreciated the tricycle may be collapsed to other configurations and further parts can be removed to achieve yet other collapsed configurations (not shown).

Compact Fold

The tricycle 20 is collapsed from the travel configuration of FIG. 1 to first collapsed configuration of FIG. 2 as follows.

Firstly, referring to FIG. 1, the locking device 98 is released. Next, referring to FIG. 13, using one hand, the over-channel tie assembly 96 is lifted, rotating on pivot 66, until above compound hinge 60. Next, over-channel tie assembly 96 is moved forward and thereby also seat 42, rotating on pivots 67 and 69, until slots 458 on seat bracket 454 release from support 242. Next, over-channel tie assembly 96 and thereby seat 42 is rotated up and back, rotating on pivots 67 and 69, in the direction shown by arrow 602 until the seat is generally vertical. Next, with hand two, referring to FIG. 9, hose 550 is slid forward on pull cord 547 and then lifted, thereby retracting lateral arms 28 back by rotation on pivots 78, to their stowed position secured by catch 416 as shown in FIG. 10. Alternately if pull cord 547 is not included, with hand two, each lateral arm 28 is rotated back on pivots 78, in the direction of arrows 606 until stowed and secured by catch 416. Next, referring to FIG. 13 and FIG. 16, and using hand two, boom 44 is lifted and rotated on boom pivot 84 in the direction shown by arrow 608 from the travel position shown in FIG. 13 to the boom position shown in FIG. 16.

Alternately in tricycles using compound hinge embodiment 60B or similar, the action of rotating the boom 44 back to the folded boom position can be performed before the action of retracting the lateral arms 28.

Next and for all compound hinge embodiments, with the hand one the over-channel tie assembly 96 and thereby seat 42 are lowered, the seat rotating on pivots 67 and 69 to the folded seat configuration shown in FIG. 16. Next, over-channel tie assembly 96 is rotated on pivot 66 in the direction shown by arrow 610 to the folded over-channel position shown in FIG. 16. Next, referring also to FIG. 7, over-channel tie assembly 96 can optionally be pushed down over catch 76, capturing pin 224 under the lip 75 of the catch.

Thus the collapsed tricycle of FIG. 2 is in one lean and neat compact package that can be rolled through narrow spaces and has been clipped together securely so it won't change shape when rolled or lifted, and there are no awkward loose parts. When the collapsing actions are performed, several of the above actions merge and the collapsing process can be completed quickly in a few smooth operations.

Additionally the collapsed tricycle of FIG. 2 can be stood on its front end resting on the outer forward edges 442 (FIG. 17) of seat 42 and over-channel tie assembly 96, thereby occupying a very small storage footprint. To assist the balancing of the tricycle in this orientation the outer forward edges 442 can protrude forward (not shown). To provide adjustment in the balancing the tricycle can include various adjustment means, and exemplary embodiments of these are shown in FIG. 17. An adjustable foot screw 439 can be fitted into a threaded hole (not shown) drilled and tapped into the upper side of tubular tie 216. Also, pair of adjustable foot plates 440 can each have a slot 441 and be attached to the outer forward portion of the seat 42 by a fastener (not shown) through the slot into the seat.

Yet another embodiment of the seat (not shown) could include threaded holes in the outer forward edges to receive adjustable foot screws. As can be appreciated, to adjust the balance of the tricycle the foot screws can be simply screwed in or out, and the fasteners on the foot plates can be loosened, the foot adjusted as required by way of the slot, and the fastener then secured.

The tricycle 20 is returned to the travel configuration of FIG. 1 from the first collapsed configuration of FIG. 2 generally using the reverse of the steps described above with the following additional steps. Firstly, referring to FIG. 16 and FIG. 7, over-channel tie assembly 96 is disengaged from catch 76 by holding the lower portion of the tie, moving it forward to disengage pin 224 from catch 76 and then lifting the tie. Also, referring to FIG. 9 and FIG. 10, before rotating each lateral arm 28 with hand two, hand one releases catch 416 by pressing handle 418.

Short Fold

The tricycle 20 is collapsed from the first collapsed configuration of FIG. 2 to second collapsed configuration of FIG. 3 as follows. First, referring to FIG. 16 and FIG. 18, quick-release axle skewer 264 is released and seat stays 33 are pulled away from pivot 69 thereby rotating chainstays 58 down and around pivot 70. Next, the seat stays are rotated forward around pivot 68 and against chainstays 58. Next, the chainstays are rotated down and around pivot 70 until rear wheel 34 approaches spine 26. This collapsed configuration shortens the collapsed tricycle without removing the rear wheel 34 and can be useful for storage in narrow car trunks.

Thus tricycle 20 includes folding means to retract the rear portion of the frame 22 thereby allowing the tricycle to be collapsed to shorter length.

The tricycle 20 is returned to the first collapsed configuration of FIG. 2 from the second collapsed configuration of FIG. 3 using the reverse of the steps described above.

Sub-Compact Fold

The tricycle 20 is collapsed from the first collapsed configuration of FIG. 2 to third collapsed configuration of FIG. 4 as follows. First, referring to FIG. 16, rear wheel 34 includes a rear axle 29, which is unlocked and the rear wheel 34 is removed. Next, quick-release axle skewer 264 is released and seat stays 33 are pulled away from pivot 69 thereby rotating chainstays 58 down and around pivot 70. Next, the stays are rotated forward around pivot 68 and against chainstays 58. Next, the chainstays are rotated down and around pivot 70 until slotted plate or dropout 59 is adjacent the spine 26. This collapsed configuration shortens the collapsed tricycle for very small storage spaces.

The tricycle 20 is returned to the first collapsed configuration of FIG. 2 from the third collapsed configuration of FIG. 4 using the reverse of the steps described above.

Suitcase Fold

The tricycle 20 is collapsed from the third collapsed configuration of FIG. 4 to fourth collapsed configuration of FIG. 5 as follows. Referring to FIG. 13, FIG. 16, and FIG. 17, the adjustable length arrangement on spine 26 is unlocked by releasing clamps 240 (FIG. 13) and the spine is shortened. Next, adjustable length seat arm 57 is unlocked by removing fasteners (not shown), and shortened. Additionally, boom 44 can be shortened if needed after releasing clamps 45 (FIG. 13). This collapsed configuration reduces the collapsed tricycle to a very small size suitable for very small spaces including some suitcases. Alternately a seat 42 of a type (not shown) with slideable length adjustment can be used to replace the length adjustment in seat arm 57.

The tricycle 20 is returned to the third collapsed configuration of FIG. 4 from the third collapsed configuration of FIG. 5 using the reverse of the steps described above.

Tricycle embodiments that include the angled chainstay pivot embodiment collapse from, and return to, the travel configuration using very similar actions except for the following differences. In collapsing to the short fold configuration of FIG. 3A, the chainstays are rotated down and around pivot 70A until rear wheel 34 is lying transversely across the tricycle adjacent the front wheels. In embodiments including chainstay catch assembly 252 (FIG. 19, FIG. 4A) and omitting the seat stays 33, that catch is engaged and released in place of axle skewer 264 and actions involving the seat stays 33 are omitted.

Other handlebar embodiments (not shown) can be used that include folding means and adjusting means known to those skilled in the art. One such exemplary handlebar embodiment 40A is shown in FIG. 13. It comprises a front tube 520 with a proximal end and a distal end, the proximal end supported by and extending from kingpin 30. The distal end of the tube includes a clamp 522. A corner tube 524 fits inside the front tube and is restrained by clamp 522. An upright tube 526 includes a clamp 528 and fits over the upper end of corner tube 524, and clamp 528 selectively restrains that tube. Clamps 522 and 528 can be of the type commonly used on handlebars on recumbent tricycles that use under-seat steering, and can include a quick-release fastener (not shown). These means can allow the upright tube to be moved forward or back, raised or lowered, tilted left or right, or rotated to a horizontal orientation.

Mesh Seat Embodiment Pivoted at the Dropouts

FIG. 18A shows an alternate mesh seat embodiment 42A on a portion of the frame 22. Seat assembly 42A has a base portion 41A and a rear portion 43A. In a configuration typical of mesh seat construction, mesh seat assembly 42A includes a pair of mirrored side tubes 473A supported by cross-brace tubes 474A and 475A and 476A. A mesh fabric (not shown for clarity) with its forward end 477 and rear end 478 represented by dashed lines is attached over the upper surface of the side tubes. Typically the mesh can be attached in various ways known to those skilled in the art including directly to the side tubes or the mesh can continue around the side tubes and can be rejoined under the seat by straps or elastic cord. Cross-brace 474A supports bracket 460A that includes spaced plates 461A with holes 464A, which are part of tie pivot 66A that can pivotably connect to the over-channel tie assembly 96 (not shown).

Cross-brace 475A supports seat bracket 454A that includes spaced plates 452A with slots 458A that engage with support 242A which can be an off-the-shelf bicycle quick-release axle and skewer as shown, providing an added clamping means to seat mounting when required. Cross-brace 476A supports seat arm assembly 57A. Sleeve 560A of the seat arm assembly pivotably encloses the straight mid-portion of the cross-brace to form rear seat pivot 67A. Extending from sleeve 560A are two arms 562A that each support at their distal ends a plate 572A having a hole 574A. Fasteners (not shown) pivotably connect those holes to holes 332 on chainstays 58 to form pivot 69A. Thus pivot 69A is a mounting on the spine to support a seat.

As can be appreciated by those skilled in the art support 242A provides a locking device on the spine which arrests the seat during tricycle travel, and releases the seat to raise to thereby allow the boom and lateral arms and the front wheels to move from their travel position to their stowed position and return to their travel position without removing the seat from the tricycle.

Spine 26A differs from the first embodiment in that the transverse sleeve 27A is wider and chainstays 58 are directly and rigidly attached to the sleeve avoiding the need for pivot 70 and reducing the weight of tricycle 20 when overall weight is a high priority. Thus in this embodiment chainstays 58 do not rotate but an attached rear wheel can still be removed to reduce the size of the collapsed tricycle. Also a seat tube is not required. Pivots 66A, 67A, 69A and slots 458A function in the same manner and functionally support the same folding actions for the compact fold as described for pivots 66, 67, 69 and slots 458.

Thus seat pivot 67 allows the seat base 41A to raise and allow the boom 44 and lateral arms 28 to fold from travel positions, with distal ends spaced from the spine 26, to stowed positions alongside the spine and return to the travel positions without removing the seat 42A from the tricycle.

In other embodiments some pivots can be replaced by rigid connections for a simpler tricycle that does not fold as compactly. For example, one embodiment (not shown) could be the aforementioned mesh seat embodiment but with rigid connections replacing rear seat pivot 67A and tie pivot 66A, and with the slots in seat bracket 454A replaced with generally vertical slots. Thus the seat could be rotated on pivot 69A and since over-channel tie 96 is now rigidly connected to the seat, in the travel configuration the weight of the rider on the seat would engage over-channel 95 onto compound hinge 60.

Inverted Kingpin Embodiment

In another embodiment of tricycle 20 (not shown), the kingpins can be replaced by an alternative kingpin embodiment or "inverted" kingpin 30A. Right kingpin 30A is shown in FIG. 12C. This type of kingpin differs in that axle 382 and steering arm 384 are attached to the lower portion of the kingpin. In the assembled tricycle, axle 382 is thereby below sleeve 372. Further, handlebars 40 can be attached to the lower portion of kingpins, or optionally to the top portion of kingpins above sleeve 372 and the attachment can be by a clamped joint. Additionally, in the compound hinge of FIG. 8, stops 142 can instead be attached to the lower flange of angular projections 80; and, on the tricycle, radius arm assembly 395 can be mounted on the underside of spine 26 and tongue 396 can be upwardly inclined enabling it to be captured between the stops.

As can be seen from the above, the tricycle 20 includes improved folding means to collapse a recumbent tricycle to a compact size quickly and easily whereby the tricycle can be collapsed to the compact fold configuration without removing the seat and by the operation of a single fastener, a significant advance over prior art. The single fastener or locking device 98 of the compound hinge 60 can arrest the lateral arms 28, and the boom 44 and the seat 42 in the travel configuration. The compact fold configuration is achieved without the use of any tools, has no removed parts to manage, is lean for transit through gates and narrow places, is rollable on its wheels, clips together securely, and can be stored on its front end for a far smaller storage foot-print.

The tricycle can also be easily collapsed to several other levels of compactness. In compound hinge 60 each layer reinforces the underlying layer. The weight of tricycles is of prime importance and, as can be appreciated, the overlaying reinforcement in compound hinge 60 allows the hinge to be made lighter and more compact for the same strength. The compact size of the compound hinge allows the inclusion of performance frame geometry and an efficient drive system 49. Our tests have shown that embodiments of the tricycle can be collapsed to the compact fold in less than 8 seconds and to the short fold in less than 13 seconds, all without removal of any parts, a major advance in the art.

While the principles of this invention have been described in connection with specific embodiments, it should be understood clearly that these descriptions are made only by way of example and are not intended to limit the scope of the invention. Many modifications are possible by substituting or adding alternative parts. The prior art of bicycles and tricycles is replete with examples of multiple versions of common parts including hinges, pivots, clamps, locking devices and catches which may be substituted. There are also many versions of means for common needs including: front wheel suspension; rear wheel suspension, including elastomer and spring suspension; motor drive systems; recumbent seat length, height and seat angle adjustment; provision for mounting common accessories such as lights and pannier racks; and others. Numerous modifications may be made to this invention without departing from its scope as defined in the appended claims.

What is claimed is:

1. A collapsible tricycle comprising:
   a spine frame having a spine supported by a rear wheel and by a pair of steerable front wheels,
   a pedal boom extending forwardly of the spine and supporting a pedal crank assembly,
   a drive system connecting the pedal crank assembly with the rear wheel, and
   a seat supported by the spine;
   a lateral arm supporting each of the front wheels, each lateral arm having a proximal end and a distal end with the front wheel pivotably attached at the distal end and an angular projection attached at the proximal end;
   a pivot connecting each angular projection to the spine and allowing each lateral arm to fold from a travel position, with the distal end spaced from the spine, to a stowed position alongside the spine; and
   clamping means on the spine to arrest the angular projections in the travel position in a position along the spine and to release the angular projections to a position pivoted away from the spine to allow folding of the lateral arms to their stowed position.

2. The tricycle as claimed in claim 1, wherein the clamping means includes opposed sides that form jaws of a manual clamp and the angular projections move in and out of the jaws.

3. The tricycle as claimed in claim 2, wherein a pivot between the pedal boom and the spine allows the pedal boom to fold back from a travel position forward of the spine to a stowed position against the spine.

4. The tricycle as claimed in claim 1, wherein a pivot between the pedal boom and the spine allows the pedal boom to fold back from a travel position forward of the spine to a stowed position against the spine and the pedal boom pivot is part of a compound hinge and the clamping means arrests the pedal boom in the travel position.

5. The tricycle as claimed in claim 4, wherein the clamping means additionally arrests and releases the seat.

6. The tricycle as claimed in claim 5, wherein the seat has a base portion and a rear portion with a seat pivot;
   a weight bearing bracket projecting from the base portion which engages with bracket supports on the spine; and
   a tie extending from the seat base portion to the clamping means which arrests the seat during tricycle travel, and releases the seat to raise and thereby allow the lateral arms and attached front wheels to move to their stowed position.

7. The tricycle as claimed in claim 6, wherein the tricycle includes a detent and catch combination, one of which is included in the seat and the other in the spine frame, which engage together to arrest the seat spaced above the spine to clear the fully stowed front wheels, and disengage to allow the seat to raise thereby allowing return of the front wheels to the travel position.

8. The tricycle as claimed in claim 1, wherein the seat has a base portion and a rear portion with a seat pivot;
   a weight bearing bracket projecting from the base portion which engages with bracket supports on the spine; and
   a tie extending from the seat base portion to the clamping means which arrests the seat during tricycle travel, and releases the seat to raise and thereby allow the lateral arms and attached front wheels to move to their stowed position.

9. The tricycle as claimed in claim 1, wherein the spine has a Y shaped cord assembly with a frame end and two arm ends, each arm end being attached to one of the lateral arms and the frame end being attached to the frame adjacent the rear wheel, whereby upward tension on the cord assembly intermediate the ends folds each lateral arm to its stowed position.

10. The tricycle as claimed in claim 1, wherein a radius arm has a pivot end and an arc end, a pivot connects the pivot end to the spine, and the arc end pivotably connects a pair of tie rods which control the steering of the front wheels, this arrangement thereby allowing the tie rods to fold with the lateral arms to their stowed position.

11. The tricycle as claimed in claim 10, wherein the radius arm includes an adjustment that can be set in a predetermined position and thereafter front wheels that are parallel when the lateral arms lie in their travel position will also be parallel when the lateral arms are folded to their stowed position, and the tricycle includes retaining means to arrest the lateral arms in their stowed position and release the lateral arms to allow them to return to their travel position, thereby allowing the tricycle to be rolled true when the lateral arms are in their stowed position.

12. The tricycle as claimed in claim 11 wherein the radius arm defines a slot along its length and a fastening means engages the slot to afford adjustment whereby the length of the radius arm from the pivot to the arc end can be adjusted.

13. The tricycle as claimed in claim 1, wherein a radius arm has a pivot end and an arc end, a pivot connects to the pivot end to the spine, and the arc end pivotably connects a pair of tie rods which control the steering of the front wheels, this arrangement thereby allowing the tie rods to fold with the lateral arms to their stowed position, and the angular projections include stops that arrest the radius arm parallel to the spine when the lateral arms are in the stowed position, thereby aligning the front wheels parallel to the spine and preventing unwanted steering when the lateral arms are in the stowed position and the tricycle is rolled on the wheels.

14. The tricycle as claimed in claim 1, wherein the frame includes one or more chainstays, each chainstay having a proximal end and a distal end, with the proximal end pivotably attached to the rear end of the spine and the rear wheel attached to the distal end, thereby allowing the chainstays to fold forward and adjacent the spine, and allowing the tricycle to be collapsed to a shorter length.

15. The tricycle as claimed in claim 1, wherein the frame includes one or more chainstays, each chainstay having a proximal end and a distal end, with the proximal end pivotably attached to the rear end of the spine and the rear wheel attached to the distal end, and the pivot is oriented to allow the chainstays to fold forward and the rear wheel to tilt from a vertical position to a stowed position lying transversely across the tricycle adjacent the front wheels and under the spine.

16. A collapsible tricycle comprising:
a spine frame having a spine supported by a rear wheel and by a pair of steerable front wheels,
a pedal boom extending forwardly of the spine and supporting a pedal crank assembly,
a drive system connecting the pedal crank assembly with the rear wheel, and
a seat supported by the spine;
wherein the front wheels each support a lateral arm having a proximal end and a distal end with the front wheel pivotably attached at the distal end, and
a pivot at the proximal end connects each lateral arm to the spine and allows each lateral arm to fold from a travel position, with the distal end spaced from the spine, to a stowed position alongside the spine; and
a pivot between the pedal boom and the spine allows the pedal boom to fold back against the spine in a stowed position, and
the seat has a base portion and a rear portion,
and the tricycle has a seat pivot in the seat rear portion, and
a weight bearing bracket projecting from the seat base portion which engages with bracket supports on the spine; and
a locking device on the spine which arrests the seat during tricycle travel, and releases the seat to raise and thereby allow the pedal boom to be stowed under the seat and allow the lateral arms and the front wheels to move from their travel position to their stowed position and return to their travel position without removing the seat from the tricycle.

17. The tricycle as claimed in claim 16, wherein the tricycle includes a tie extending from the seat base portion to the locking device on the spine.

18. The tricycle as claimed in claim 17, wherein the tie has a detent which engages a catch on the spine, arresting the tie and supporting the base portion of the seat spaced above the spine to clear the fully stowed front wheels, and allowing the tie to be detached and the seat to raise to allow return of the front wheels to the travel position.

19. The tricycle as claimed in claim 16, wherein the tricycle includes a detent and catch combination, one of which is included in the seat and the other included in the spine, and which engage together and arrest the seat spaced above the spine to clear the fully stowed front wheels, and allow the seat to be detached and raise to allow return of the front wheels to the travel position.

20. A collapsible tricycle comprising:
a spine frame having a spine supported by a rear wheel and by a pair of steerable front wheels,
the spine having a forward end and a rear end,
a pedal boom extending forwardly of the spine and supporting a pedal crank assembly,
a drive system connecting the pedal crank assembly with the rear wheel, and
a seat supported by the spine;
wherein the front wheels each support a lateral arm having a proximal end and a distal end with the front wheel pivotably attached at the distal end, and
a pivot at the proximal end connects each lateral arm to the spine and allows each lateral arm to fold from a travel position, with the distal end spaced from the spine, to a stowed position alongside the spine; and
a pivot between the pedal boom and the spine allows the pedal boom to fold back against the spine in a stowed position, and
the seat has a base portion and a rear portion, and
wherein the spine frame includes one or more chainstays, each chainstay having a proximal end and a distal end, with the proximal end of each chainstay pivotably attached by a chainstay pivot to the rear end of the spine and the rear wheel attached to the distal end of each chainstay,
and the chainstay pivot is oriented to allow the chainstays to fold forward and the rear wheel to tilt from a vertical position to a stowed position lying transversely across the tricycle adjacent the front wheels and under the spine.

21. A collapsible tricycle frame comprising:
a spine, supporting mountings for a rear wheel and mountings for a pair of steerable front wheels,
a pedal boom extending forwardly of the spine and supporting a mount for a pedal crank assembly,
mountings on the spine to support a seat,
a lateral arm supporting each of the front wheel mountings, each lateral arm having a proximal end and a distal end with the front wheel mountings pivotably attached at the distal end and an angular projection attached at the proximal end; and
a pivot connecting each angular projection to the spine and allowing each lateral arm to fold from a travel position, with the distal end spaced from the spine, to a stowed position alongside the spine; and
a clamp contacting the angular projections to arrest the angular projections in the travel position along the spine, the clamp being releasable to permit the angular projections to pivot away from the spine to allow folding of the lateral arms to their stowed position.

22. The tricycle frame as claimed in claim 21, wherein the clamp includes opposed sides that form jaws of a manual clamp and the angular projections move in and out of the jaws.

23. The tricycle frame as claimed in claim 22, wherein a pivot between the pedal boom and the spine allows the pedal boom to fold back from a travel position forward of the spine to a stowed position against the spine.

24. The tricycle frame as claimed in claim 21, wherein a pivot between the pedal boom and the spine allows the pedal boom to fold back from a travel position forward of the spine to a stowed position against the spine and the pedal boom pivot is part of a compound hinge and the clamp arrests the pedal boom in the travel position.

25. The tricycle frame as claimed in claim 24, wherein a radius arm has a pivot end and an arc end, a pivot connects the pivot end to the spine, and the arc end pivotably connects a pair of tie rods which control the steering of front wheels when attached, this arrangement thereby allowing the tie rods to fold with the lateral arms to their stowed position; and the radius arm includes an adjustment that can be set in a predetermined position and thereafter front wheels, when attached, that are parallel when the lateral arms lie in their travel position will also be parallel when the lateral arms are folded to their stowed position.

* * * * *